United States Patent
Takahashi

(10) Patent No.: US 10,262,796 B2
(45) Date of Patent: Apr. 16, 2019

(54) DIELECTRIC COMPOSITION AND ELECTRONIC COMPONENT

(71) Applicant: TDK CORPORATION, Tokyo (JP)

(72) Inventor: Tetsuhiro Takahashi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/658,791

(22) Filed: Jul. 25, 2017

(65) Prior Publication Data
US 2018/0040424 A1 Feb. 8, 2018

(30) Foreign Application Priority Data

Aug. 3, 2016 (JP) .................................. 2016-153013
Aug. 3, 2016 (JP) .................................. 2016-153014

(51) Int. Cl.
*C04B 35/495* (2006.01)
*H01G 4/12* (2006.01)
(Continued)

(52) U.S. Cl.
CPC ......... *H01G 4/1254* (2013.01); *C04B 35/495* (2013.01); *C04B 35/6261* (2013.01); *C04B 35/62645* (2013.01); *C04B 35/64* (2013.01); *H01G 4/1272* (2013.01); *H01G 4/30* (2013.01); *C04B 2235/3201* (2013.01); *C04B 2235/3206* (2013.01); *C04B 2235/3213* (2013.01); *C04B 2235/3215* (2013.01); *C04B 2235/3225* (2013.01); *C04B 2235/3227* (2013.01); *C04B 2235/3251* (2013.01); *C04B 2235/3293* (2013.01); *C04B 2235/3294* (2013.01);
(Continued)

(58) Field of Classification Search
CPC .. C04B 35/495; C04B 35/62685; H01G 4/30; H01G 4/1254; H01B 3/12
See application file for complete search history.

(56) References Cited

U.S. PATENT DOCUMENTS

| | | | | |
|---|---|---|---|---|
| 7,727,921 B2 * | 6/2010 | Takeda | .................. | C04B 35/495 361/321.4 |
| 2009/0290285 A1 | 11/2009 | Takeda | | |
| 2010/0085681 A1 * | 4/2010 | Takeda | ................ | C04B 35/4682 361/301.4 |

FOREIGN PATENT DOCUMENTS

| | | |
|---|---|---|
| JP | 2000-124058 A | 4/2000 |
| WO | 2008/102608 A1 | 8/2008 |
| WO | 2008/155945 A1 | 12/2008 |

* cited by examiner

*Primary Examiner* — Noah S Wiese
(74) *Attorney, Agent, or Firm* — Oliff PLC

(57) ABSTRACT

A dielectric composition is provided. The dielectric composition includes a tungsten bronze type complex oxide expressed by a chemical formula $(K_{1-x}Na_x)Sr_2Nb_5O_{15}$ as a main component, x satisfying $0 \le x \le 0.50$, wherein the dielectric composition includes a secondary phase of at least one or more selected from: $MgO \cdot SiO_2$; $BaO \cdot 2MgO \cdot 2SiO_2$; and $2MgO \cdot B_2O_3$; or the dielectric composition includes a tungsten bronze type complex oxide expressed by a chemical formula $(K_{1-x}Na_x)Sr_2Nb_5O_{15}$ as a main component, x satisfying $0 \le x \le 0.40$, wherein the dielectric composition includes: MgO; BaO; $B_2O_3$; $SiO_2$; and $P_2O_5$ as a first accessory component in a total content of 2.5 mol to 20.0 mol per 100 mol of the main component.

9 Claims, 1 Drawing Sheet

(51) Int. Cl.
  *H01G 4/30*      (2006.01)
  *C04B 35/626*   (2006.01)
  *C04B 35/64*    (2006.01)

(52) U.S. Cl.
  CPC ............... *C04B 2235/3409* (2013.01); *C04B 2235/3418* (2013.01); *C04B 2235/3436* (2013.01); *C04B 2235/3445* (2013.01); *C04B 2235/447* (2013.01); *C04B 2235/5436* (2013.01); *C04B 2235/5445* (2013.01); *C04B 2235/6562* (2013.01); *C04B 2235/6565* (2013.01); *C04B 2235/6567* (2013.01); *C04B 2235/6582* (2013.01); *C04B 2235/661* (2013.01); *C04B 2235/662* (2013.01)

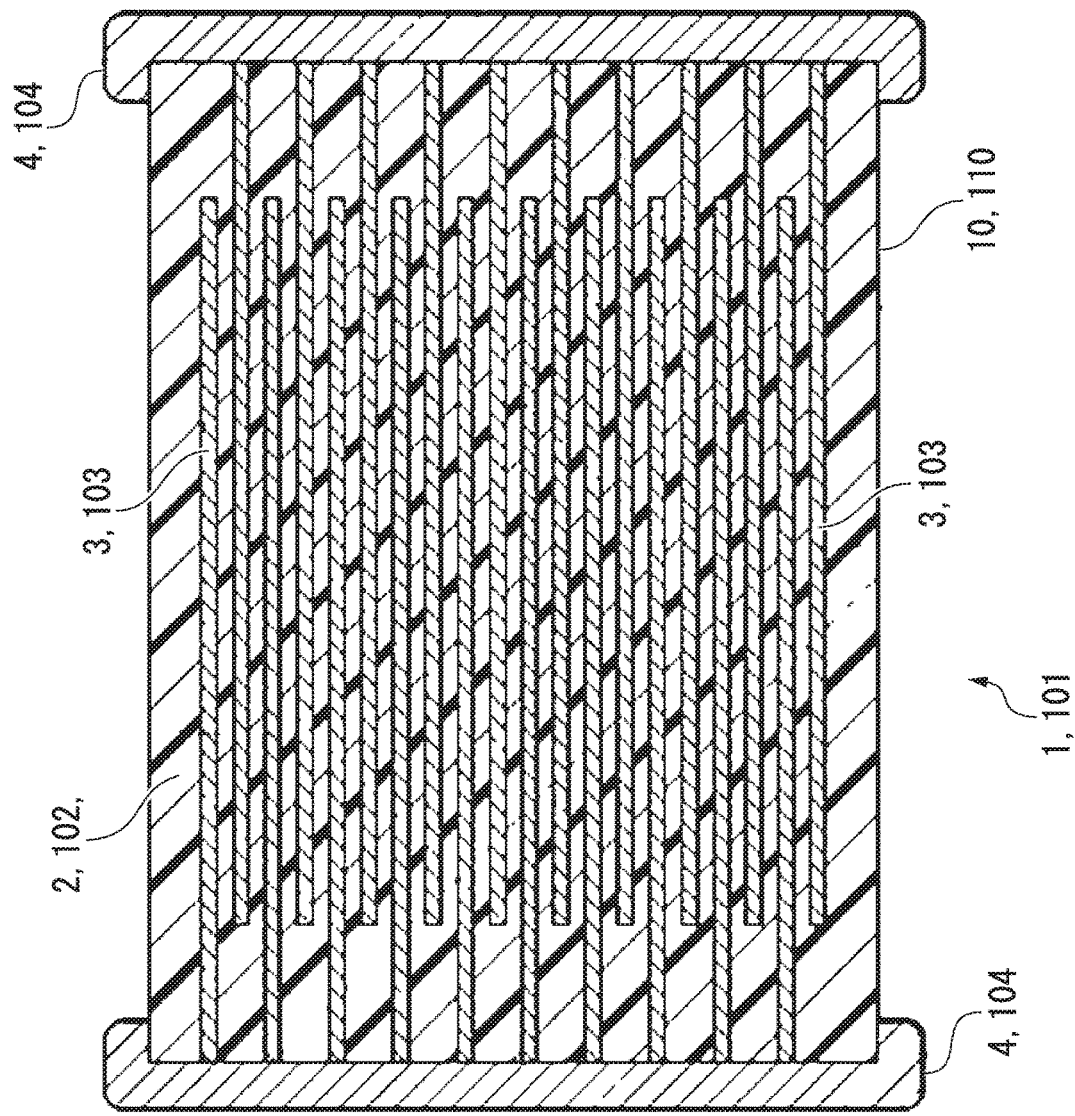

DIELECTRIC COMPOSITION AND ELECTRONIC COMPONENT

BACKGROUND OF THE INVENTION

Field of the Invention

The present invention relates to a dielectric composition, which is particularly suitable for being used in a high-temperature condition such as one for automotive use; and an electronic component in which the dielectric composition is used as a dielectric layer.

Priority is claimed on Japanese Patent Application No. 2016-153013 and Japanese Patent Application No. 2016-153014 filed Aug. 3, 2016, both of which were filed on Aug. 3, 2016, the contents of which are incorporated herein by reference.

Description of Related Art

The laminated ceramic capacitors are mounted on many electronic devices because of their high reliability and low cost. Specific examples of electronic devices include information terminals such as cellular phones, home appliances, and automobile electrical components. Among them, in laminated ceramic capacitors used for automotive use, guarantee is required to a higher-temperature range compared to the laminated ceramic capacitor used for home appliances, information terminals, or the like. In order to retain their functions, high insulation properties are required.

Moreover, in laminated ceramic capacitors for surge voltage removal, which are expected to be used in the high temperature range at 150° C. or more and mounted on the inverter circuit using the power semiconductors of SiC, GaN or the like, high insulation property is required in the wide range of temperature from the room temperature to at least 200° C., for example, to about 250° C.

In WO 2008/155945 discloses a laminated ceramic capacitor using a dielectric composition, which includes a mixed crystal system of a tungsten bronze structure compound and perovskite structure compound as the main component. The tungsten bronze structure compound is a dielectric ceramic composition that shows a sufficient dielectric constant; and stable capacitance-temperature characteristics and high resistivity ρ can be obtained even at high temperature about 175° C. by using this tungsten bronze structure compound. The tungsten bronze structure compound is expressed by the chemical formula $(1-a)(K_{1-x}Na_x)(Sr_{1-y-z}Ba_yCa_z)_2Nb_5O_{15}-a(Ba_{1-b}Ca_b)TiO_3$. The dielectric ceramic composition includes the accessory component in 0.1 to 40 mol part per 100 mol part of the above-described main component.

In addition, WO 2008/102608 discloses a dielectric ceramic composition having high resistivity at the room temperature because it includes: the tungsten bronze type complex oxide expressed by the chemical formula $(K_{1-x}Na_x)Sr_2Nb_5O_{15}$ (where $0 \leq x < 0.2$) as the main component; and 0.05-20 mol part of a rare-earth element and 0.05-40 mol part of Mn, V, Li or the like, as the accessory component.

Japanese Unexamined Patent Application, First Publication No. 2000-124058 discloses a method for improving high temperature load life of the laminated ceramic dielectric capacitor by including $[(Ba_{1-x-y}Ca_xSr_y)O]_m \cdot (Ti_{1-z}Zr_z)O_2$ as the main component and 0.005-0.5 weight % of $P_2O_5$ (about 0.5 mol % after being converted to the value in mol %) as the accessory component to the dielectric composition for the dielectric composition to behave as a barrier layer preventing migration of Ni ions in a high temperature load test.

SUMMARY OF THE INVENTION

Problems to be Solved

Although WO 2008/155945 discloses that good insulation properties is obtained in the high temperature range (175° C.), change rate of the resistivity is not mentioned. In addition, although WO 2008/102608 discloses that good insulation properties is obtained at room temperature by including varieties of the accessory component, the resistivity in the high temperature range, for example from 200° C. to 250° C., is not mentioned.

In addition, although Japanese Unexamined Patent Application, First Publication No. 2000-124058 discloses that long high-temperature load life is obtained by including $P_2O_5$ in the perovskite type barium titanate material, the resistivity at the room temperature or at 200° C.; and the change ratio of the resistivity are not considered.

The present invention is made under the circumstances described above. The purpose of the present invention is to provide a dielectric composition having: high resistivity in high-temperature atmosphere from 200° C. to 250° C. for the automobile use and the power device using a SiC-based or GaN-based semiconductor; and low change ratio of the resistivity from the room temperature to 200° C. or from the room temperature to 250° C. In addition, an electronic component using the dielectric composition is provided.

Means to Solve the Problem

In order to achieve the above-described purpose, the dielectric composition, which is an aspect of the present invention, (hereinafter, referred as "the dielectric composition of the present invention") is configured as described below.

(1) A dielectric composition including a tungsten bronze type complex oxide expressed by a chemical formula $(K_{1-x}Na_x)Sr_2Nb_5O_{15}$ as a main component, x satisfying $0 \leq x \leq 0.50$, wherein the dielectric composition includes a secondary phase of at least one or more selected from: $MgO \cdot SiO_2$; $BaO \cdot 2MgO \cdot 2SiO_2$; and $2MgO \cdot B_2O_3$.

By the dielectric composition having the above-described features, the dielectric composition having good insulation suitable for variety of usages in broad temperature range from the room temperature to 250° C. can be provided. Good insulation means the dielectric composition shows high resistivity at 250° C.; and the change ratio of the resistivity is low in the broad temperature range from the room temperature to 250° C.

In addition, by using the dielectric layer made of the dielectric composition, capacitors and the like used for: automobile use required to be used from at a low-temperature range about −55° C. to at a temperature range about 150° C.; snubber capacitors for the power devices using the SiC-based or GaN-based semiconductor required to be used at even higher temperature range about 250° C.; and capacitors used for noise removal in the engine room of automobiles, can be provided.

(2) The dielectric composition according to the above-described (1), wherein, when a total area of a cross section of the dielectric composition is defined as 100%, an area occupied by the secondary phase in a cross section is 1.5% to 20.0%.

(3) The dielectric composition according to the above-described (1) or (2), further including one or more of:

La$_2$O$_3$; SnO$_2$; Y$_2$O$_3$; Sb$_2$O$_3$; Ta$_2$O; and Nb$_2$O$_5$ as an accessory component in a content of 0.5 mol to 5.0 mol per 100 mol of the main component.

The electronic component, which is other aspect of the present invention, (hereinafter, referred as "the electronic component of the present invention") is configured as described below.

(4) An electronic component comprising a dielectric layer and an internal electrode layer, wherein the dielectric layer is made of the dielectric composition according to any one of the above-described (1) to (3).

The dielectric composition, which is other aspect of the present invention, (hereinafter, referred as "the dielectric composition of the present invention") is configured as described below.

(5) A dielectric composition including a tungsten bronze type complex oxide expressed by a chemical formula (K$_{1-x}$Na$_x$)Sr$_2$Nb$_5$O$_{15}$ as a main component, x satisfying 0≤x≤0.40, wherein the dielectric composition includes: MgO; BaO; B$_2$O$_3$; SiO$_2$; and P$_2$O$_5$ as a first accessory component in a total content of 2.5 mol to 20.0 mol per 100 mol of the main component.

By the dielectric composition having the above-described features, the dielectric composition having good insulation suitable for variety of usages in broad temperature range from the room temperature to 200° C. can be provided. Good insulation means the dielectric composition shows high resistivity at 200° C.; and the change ratio of the resistivity is low in the broad temperature range from the room temperature to 200° C.

In addition, by using the dielectric layer made of the dielectric composition, capacitors and the like used for: automobile use required to be used from at a low-temperature range about −55° C. to at a temperature range about 150° C.; snubber capacitors for the power devices using the SiC-based or GaN-based semiconductor required to be used at even higher temperature range about 200° C.; and capacitors used for noise removal in the engine room of automobiles, can be provided.

(6) The dielectric composition according to the above-described (5), wherein when the first accessory component is expressed by aMgO-bBaO-cB$_2$O$_3$-dSiO$_2$-eP$_2$O$_5$, a relationship of a, b, c, d, and e satisfies:

a+b+c+d+e=1.00;
0.50≤a≤0.75;
0.02≤b≤0.15;
0.05≤c≤0.25;
0.05≤d≤0.25; and
0.02≤e≤0.15.

(7) The dielectric composition according to the above-described (5) or (6), further including at least one or more selected from: La$_2$O$_3$; SnO$_2$; Y$_2$O$_3$; Sb$_2$O$_3$; Ta$_2$O$_5$; and Nb$_2$O$_5$ as a secondary accessory component in a content of 0.5 mol to 5.0 mol per 100 mol of the main component.

(8) The dielectric composition according to any one of the above-described (5) to (7), further including a secondary phase including MgO and P$_2$O$_5$, wherein when a total area of a cross section of the dielectric composition is defined as 100%, an area occupied by the secondary phase in the cross section is 2.0% to 15.0%.

(9) An electronic component including a dielectric layer and an internal electrode layer, wherein the dielectric layer is made of the dielectric composition according to any one of the above-described (5) to (7).

Advantageous Effect of the Invention

The purpose of the present invention is to provide a dielectric composition having: high resistivity in high-temperature atmosphere from 200° C. to 250° C. for the automobile use and the power device using a SiC-based or GaN-based semiconductor; and low change ratio of the resistivity from the room temperature to 200° C. or from the room temperature to 250° C. In addition, an electronic component using the dielectric composition is provided.

BRIEF DESCRIPTION OF THE DRAWINGS

FIG. 1 shows a cross section of the laminated ceramic capacitor of the first and second embodiment of the present invention.

DETAILED DESCRIPTION OF THE INVENTION

[Embodiments]

First, the laminated ceramic capacitor, which is the main application of the dielectric composition of the present invention, will be described. The following description is a description of the same common configuration in the first and second embodiments to be described later. FIG. 1 is a cross-sectional view of a general laminated ceramic capacitor.

The laminated ceramic capacitor 1, 101 has a capacitor element body 10, 110 of a structure in which the dielectric layers 2, 102 and the internal electrode layers 3, 103 are alternately laminated. At both ends of the capacitor element bodies 10 and 110 are formed a pair of external electrodes 4 and 104 which are in electrical communication with the internal electrode layers 3 alternately arranged inside the capacitor element bodies 10 and 110, respectively. The shape of the capacitor element body 10, 110 is not particularly limited, but it is usually rectangular parallelepiped shape. In addition, the size is not particularly limited, and it may be set to an appropriate size according to the application.

The internal electrode layers 3, 103 are laminated so that the respective end faces are alternately exposed on the surfaces of the two opposing end portions of the capacitor element bodies 10, 110. A pair of external electrodes 4, 104 is formed at both ends of the capacitor element bodies 10, 110 and is connected to the exposed end faces of the alternately arranged internal electrode layers 3, 103 to constitute a capacitor circuit.

The thickness of the dielectric layer 2, 102 is not particularly limited, but it is preferably 100 μm or less per layer, more preferably 30 μm or less. The lower limit of the thickness is not particularly limited but is, for example, about 0.5 μm. According to the dielectric composition of the present invention, it is possible to form laminated ceramic capacitors 1, 101 having good insulating properties even when the interlayer thickness is 0.5 μm to 30 μm.

The number of stacked layers of the dielectric layers 2, 102 is not particularly limited, but it is preferably 20 or more, and more preferably 50 or more.

The conductive material contained in the internal electrode layers 3, 103 is not particularly limited, but Ni, a Ni alloy, Cu or a Cu alloy is preferable. Various trace components such as P may be contained in an amount of about 0.1 mass % or less in the Ni, Ni based alloy, Cu or Cu based alloy. In addition, the internal electrode layers 3, 103 may be formed using commercially available electrode paste. The thickness of the internal electrode layers 3, 103 may be appropriately determined according to the application and the like.

More preferably, the conductive material contained in the internal electrode layer 3 is Ni or a Ni-based alloy since the constituent material of the dielectric layers 2, 102 has reduction resistance. It is more preferable that this Ni or Ni-based alloy is a main component and contains one or more accessory components selected from Al, Si, Li, Cr and Fe.

By including one or more of accessory components selected from Al, Si, Li, Cr and Fe in the Ni or Ni based alloy which is the main component of the internal electrode layers 3 and 103, oxygen reacts with the accessory components before Ni is converted to NiO by reacting with the oxygen in the air to form an oxide film of the accessory components on the surface of Ni. As a result, the oxygen in the air cannot react with Ni unless it passes through the oxide film of the accessory components, so that Ni is hardly oxidized. As a result, even when continuously used at a high temperature of 250° C., deterioration of continuity and conductivity due to oxidation of the internal electrode layer containing Ni as a main component becomes difficult to occur.

The conductive material contained in the external electrodes 4, 104 is not particularly limited, but in the present invention, inexpensive Ni, Cu and Au, Ag, Pd having high-heat resistance; or alloys thereof, can be used. The thickness of the external electrodes 4, 104 may be appropriately determined depending on the application and the like, but is usually preferably about 10 to 50 μM.

Next, the dielectric composition according to the present embodiment will be described in detail separately in the first embodiment and the second embodiment.

(First Embodiment)

The dielectric composition according to the present embodiment is a dielectric composition containing a tungsten bronze type composite oxide represented by a chemical formula $(K_{1-x}Na_x)Sr_2Nb_5O_{15}$ ($0 \leq x \leq 0.50$) as a main component, wherein the dielectric composition contains at least one or more secondary phases selected from $2MgO \cdot SiO_2$, $BaO \cdot 2MgO \cdot 2SiO_2$ and $2MgO \cdot B_2O_3$.

By having the above characteristics of the dielectric composition, it is possible to provide a dielectric composition having good insulating properties suitable for use in a wide range from room temperature to 250° C. Factors for which such effects are obtained are described below.

The inventors have found that an effect of suppressing increase and movement of the majority carrier electrons, which are considered to be the major cause of a decrease in resistivity, can be obtained from room temperature to a high temperature range of about 250° C. by including a secondary phase of at least one or more selected from $2MgO \cdot SiO_2$, $BaO \cdot 2MgO \cdot 2SiO_2$ and $2MgO \cdot B_2O_3$ in a dielectric composition containing a tungsten bronze type composite oxide represented by the chemical formula $(K_{1-x}Na_x)Sr_2Nb_5O_{15}$ ($0 \leq x \leq 0.50$) as a main component. As a result, we believe that it has become possible to maintain high insulation performance over a wide temperature range from room temperature to about 250° C., which was difficult to realize so far.

The above-described secondary phase means: a particle; or a segregation phase existing in a grain boundary or a grain boundary triple point, including at least one or more selected from $2MgO \cdot SiO_2$, $BaO \cdot 2MgO \cdot 2SiO_2$ and $2MgO \cdot B_2O_3$ at 90 mol % or more in the present specification.

$(K_{1-x}Na_x)Sr_2Nb_5O_{15}$ in the above-described chemical formula is substituted by Na. The substitution amount x is $0 \leq x \leq 0.50$. If the substitution amount x exceeded 0.50, the effect of suppressing increase and movement of the majority carrier electrons, which are considered to be the major cause of a decrease in resistivity cannot be obtained, even if it contains secondary phases ($2MgO \cdot SiO_2$, $BaO \cdot 2MgO \cdot 2SiO_2$ and $2MgO \cdot B_2O_3$) which is the unique feature of the dielectric composition according to the present embodiment. As a result, the resistivity at 250° C. is lowered; and the change ratio of the resistivity from the room temperature to 250° C. increases.

The dielectric composition contains at least one or more selected from $2MgO \cdot SiO_2$, $BaO \cdot 2MgO \cdot 2SiO_2$ and $2MgO \cdot B_2O_3$ as the secondary phase. The secondary phase has characteristics that the resistivity is high and there is almost no change in the resistivity in the temperature range from room temperature to about 250° C. Thus, by using the dielectric composition containing the secondary phase, the effect of suppressing the increase and the movement of electrons, which are majority carriers considered to be the main cause of the decrease in resistivity. On the other hand, in the case where the secondary phase is not included, it is not possible to obtain the effect of suppressing the increase and the movement of electrons, which are majority carriers considered to be the main cause of the decrease in resistivity. As a result, the resistivity at 250° C. decreases; and the change ratio of the resistivity from room temperature to 250° C. is deteriorated. "The dielectric composition includes the secondary phase" means that the area ratio occupied by the secondary phase is 1.5% or more when the entire area of a cross-section of the dielectric composition is defined as 100%.

It is preferable that the area ratio occupied by the secondary phase is 1.5% to 20.0% when the entire area of a cross-section of the dielectric composition is defined as 100%, as a preferred embodiment of the present invention. By setting the area ratio to the above-described range, the resistivity at 250° C. can be further increased, so that the change ratio of the resistivity from room temperature to 250° C. can be further reduced.

In the case of the laminated ceramic capacitor, which is an example of the present embodiment, the above-described area ratio can be obtained by: performing micro-sampling by using FIB (Focused Ion Beam); preparing a TEM sample of the dielectric layer; and performing STEM-EDS (Scanning Transmission Electron Microscopy-Energy Dispersive X-ray Spectrometry) mapping by using a scanning transmission electron microscope. It is preferable that 10 or more of mappings are performed on each sample in the mapping view field of 7 μm×7 μm. Alternatively, the area ratio can be obtained by performing elemental mapping on a polished cross section of the dielectric layer by EPMA (Electron Probe Micro Analyzer). In this case, the area ratio may be calculated from elemental maps obtained by performing mapping of 5 or more of view fields on each sample in the mapping view field of 10 μm×10 μm.

It is preferable that the dielectric composition includes at least one or more selected from: $La_2O_3$; $SnO_2$; $Y_2O_3$; $Sb_2O_3$; $Ta_2O$; and $Nb_2O_5$ as component in a content of 0.5 mol to 5.0 mol per 100 mol of the main component, as a preferred embodiment of the present invention. By including La as the accessory component, it is easy to obtain a secondary phase in the dielectric composition, and it is also easy to obtain the effect of increasing the fluidity of the secondary phase. In addition, by including at least one selected from Sn, Y, Sb, Ta, and Nb, the fluidity of the secondary phase can be further enhanced. Thus, it becomes easy to obtain the effect of the secondary phase being uniformly distributed without biased distribution of the secondary phase in the dielectric composition. As a result, it is possible to achieve improvement in both of insulation and direct current withstand voltage.

As described above, the dielectric composition according to the present embodiment exhibits favorable characteristics in a high-temperature range. Thus, it can be suitably utilized in the temperature range (−55° C. to 250° C.) used in the SiC or GaN-based power device. In addition, it can be suitably used as an electronic part for noise elimination under severe environments such as an automobile engine room.

In the chemical formula $(K_{1-x}Na_x) Sr_2Nb_5O_{15}$, the molar ratio of the K site, the Sr site, the Nb site and the O site is basically 1:2:5:15. However, as long as it retains the tungsten bronze structure, the molar ratio may be increased or decreased in a certain degree.

In addition, the dielectric composition according to the present embodiment may contain minute impurities or accessory components, as long as it does not greatly degrade the good insulation, which is the effect of the present invention. For example, impurities include Mn, V, Cr or the like. Therefore, the content of the main component is not particularly limited, but is, for example, 50 mol % or more and less than 100 mol % with respect to the entire dielectric composition containing the main component.

Next, a method of producing the dielectric composition according to this embodiment will be described. As a method of producing the dielectric composition, a known method may be adopted. For example, a solid phase method or the like in which starting materials such as oxide powder and carbonate are mixed, and the resultant mixed powder is heat-treated and synthesized may be adopted.

For $(K_{1-x}Na_x) Sr_2Nb_5O_{15}$ which is the main component, $K_2CO_3$, $Na_2CO_3$, $SrCO_3$, $Nb_2O_5$ powders having an average particle diameter of 1.0 µm or less are prepared as a starting material. After weighing them to have a predetermined ratio, wet blending is performed for a predetermined time by using a ball mill or the like. After drying the mixed powder, heat treatment is performed at 1000° C. or less in the air to obtain a calcined powder of $(K_{1-x}Na_x) Sr_2Nb_5O_{15}$.

For the other inclusions (secondary phase, accessory components, etc.), MgO, $SiO_2$, $BaCO_3$, $B_2O_3$, $La_2O_3$, $SnO_2$, $Y_2O_3$, $Sb_2O_3$, $Ta_2O_5$, and $Nb_2O_5$ powders having an average particle diameter of 1.0 µm or less are prepared as starting materials. After weighing them to have a predetermined ratio, wet blending is performed for a predetermined time by using a ball mill or the like. After drying the mixed powder, heat treatment is performed in the air at 700° C. to 800° C. for 1 to 5 hours to prepare substances other than the main component. As described above, with regard to inclusions other than the main component, by mixing and heat treatment separately from the main component, it is easy to form a secondary phase in the dielectric composition.

Thereafter, the resultant calcined powder of $(K_{1-x}Na_x) Sr_2Nb_5O_{15}$ and the calcined powder of other inclusions are mixed and crushed to prepare a mixed powder having an average particle diameter of 0.5 µm to 2.0 µm.

Next, an example of a method of producing the laminated ceramic capacitor shown in FIG. 1 will be described.

Like the conventional laminated ceramic capacitor, the laminated ceramic capacitor 1 of the present embodiment is produced by preparing a green chip by an ordinary printing method or a sheet method using a paste, calcining the green chip, applying external electrodes, and calcining it. Hereinafter, the production method will be described in detail.

The mixed powder obtained as described above is made into a paint to prepare a dielectric layer paste. The dielectric layer paste may be an organic paint obtained by kneading a dielectric mixed powder and an organic vehicle or may be an aqueous paint.

The organic vehicle is a binder dissolved in an organic solvent. The binder used for the organic vehicle is not particularly limited, and may be appropriately selected from various ordinary binders such as ethyl cellulose and polyvinyl butyral. The organic solvent to be used is also not particularly limited, and it may be appropriately selected from various organic solvents such as terpineol, butyl carbitol, acetone and the like depending on the method of use such as printing method and sheet method.

When the dielectric layer paste is used as a water-based coating material, an aqueous vehicle obtained by dissolving a water-soluble binder, a dispersant, or the like in water may be kneaded with the dielectric material. The water-soluble binder used for the aqueous vehicle is not particularly limited, and for example, polyvinyl alcohol, cellulose, water-soluble acrylic resin, or the like may be used.

The internal electrode layer paste is prepared by kneading: the above conductive material composed of various conductive metals or alloys, or various oxides, organometallic compounds, resinates or the like to be the above-mentioned conductive materials after calcining; and the above-mentioned organic vehicle.

The external electrode paste may be prepared in the same manner as the internal electrode layer paste described above.

There is no particular limitation on the content of the organic vehicle in each of the above-mentioned pastes, and it may be set to a usual content, for example, about 1 mass % to 5 mass % for the binder and about 10 mass % to 50 mass % for the solvent. In addition, additives selected from various dispersants, plasticizers, dielectrics, insulators, and the like may be contained in each paste as necessary. The total content of these is preferably 10% by mass or less.

When a printing method is used, the dielectric layer paste and the internal electrode layer paste are printed and laminated on a substrate such as PET, cut into a predetermined shape, and peeled from the substrate to form a green chip.

In the case of using the sheet method, a green sheet is formed using a dielectric layer paste; an internal electrode layer paste is printed on the green sheet; and these are laminated to form a green chip.

Before calcining, binder removal treatment is applied to the green chip. As the binder removal condition, the heating rate is preferably 5° C./hour to 300° C./hour, the holding temperature is preferably 180° C. to 500° C., and the temperature holding time is preferably 0.5 hour to 24 hours. Further, the calcining atmosphere is air or a reducing atmosphere. In the above binder removal treatment, wetter or the like may be used to humidify the $N_2$ gas, the mixed gas, or the like. In this case, the water temperature is preferably about 5° C. to 75° C.

The holding temperature at the time of calcining is preferably 1000° C. to 1400° C., more preferably 1100° C. to 1350° C. When the holding temperature is lower than the above-described range, the densification becomes insufficient. When the holding temperature exceeds the above-described range, discontinuity of the electrode due to abnormal sintering of the internal electrode layer and degradation of capacity change rate due to diffusion of the internal electrode layer constituting material are likely to occur. On the other hand, if it exceeds the above range, there is a possibility that the crystal grains become coarse for the insulating property to be deteriorated.

The heating rate is preferably 200° C./hour to 5000° C./hour, more preferably 1000° C./hour to 5000° C./hour. Further, in order to control the particle size distribution after sintering within the range of 0.5 µm to 5.0 µm for suppressing the volume diffusion between the crystal grains, the temperature holding time is preferably 0.5 hour to 2.0 hours, more preferably 0.5 hour to 1.0 hour; and the cooling rate is preferably 100° C./hour to 500° C./hour, more preferably 200° C./hour to 300° C./hour.

In addition, as the atmosphere for calcining, it is preferable to use a mixed gas of humidified $N_2$ and $H_2$; and calcining at an oxygen partial pressure of $10^{-2}$ to $10^{-6}$ Pa. More preferably, the oxygen partial pressure is $10^{-2}$ to $10^{-5}$ Pa. By performing calcining in an atmosphere having a high oxygen partial pressure, an effect of easily precipitating a secondary phase can be obtained. However, when calcining is performed in a state where the oxygen partial pressure is high, in the case of the internal electrode layer made of Ni, Ni oxidizes and the conductivity as an electrode decreases. In this case, by including one or more of accessory components selected from Al, Si, Li, Cr and Fe in the conductive material containing Ni as a main component, which is a more preferred configuration of the present embodiment, the oxidation resistance of Ni is improved. Accordingly, even in an atmosphere having a high oxygen partial pressure, it is possible to ensure conductivity of the internal electrode layer.

After calcining, an annealing treatment is performed on the obtained capacitor element body as necessary. The annealing treatment condition may be a known condition. For example, it is preferable that the oxygen partial pressure at the time of annealing is higher than the oxygen partial pressure at the time of baking and the holding temperature is 1000° C. or lower.

In the above description, the production method, in which the binder removal processing, the calcining and the annealing treatment are carried out independently, is described. However, they may be carried out continuously.

The capacitor element body obtained as described above is subjected to end face polishing by, for example, barrel polishing or sand blasting, and the external electrode paste is applied and calcined to form the external electrode 4. Then, if necessary, a coating layer is formed on the surface of the external electrode 4 by plating or the like.

Although the first embodiment of the present invention has been described above, the present invention is not limited to the above-described embodiment at all, and various modifications can be made without departing from the scope of the present invention.

(Second Embodiment)

The dielectric composition according to the present embodiment is a dielectric composition containing a tungsten bronze type complex oxide expressed by a chemical formula $(K_{1-x}Na_x)Sr_2Nb_5O_{15}$ as a main component, x satisfying $0 \le x \le 0.40$, wherein the dielectric composition contains: MgO; BaO; $B_2O_3$; $SiO_2$; and $P_2O_5$ as a first accessory component in a total content of 2.5 mol to 20.0 mol per 100 mol of the main component.

By having the above characteristics of the dielectric composition, it is possible to provide a dielectric composition having good insulating properties suitable for use in a wide range from room temperature to 200° C. Factors for which such effects are obtained are described below.

The inventors have found that an effect of suppressing increase and movement of the majority carrier electrons, which are considered to be the major cause of a decrease in resistivity, can be obtained from room temperature to a high temperature range of about 200° C. by including a predetermined amount of a first accessory component made of MgO; BaO; $B_2O_3$; $SiO_2$; and $P_2O_5$ in a dielectric composition containing a tungsten bronze type complex oxide expressed by a chemical formula $(K_{1-x}Na_x)Sr_2Nb_5O_{15}$ as a main component, x satisfying $0 \le x \le 0.40$. As a result, we believe that it has become possible to maintain high insulation performance over a wide temperature range from room temperature to about 200° C., which was difficult to realize so far.

$(K_{1-x}Na_x)Sr_2Nb_5O_{15}$ in the above-described chemical formula is substituted by Na. The substitution amount x is $0 \le x \le 0.40$. If the substitution amount x exceeded 0.40, the effect of suppressing increase and movement of the majority carrier electrons, which are considered to be the major cause of a decrease in resistivity cannot be obtained, even if it contains the first accessory component made of MgO; BaO; $B_2O_3$; $SiO_2$; and $P_2O_5$ which is the unique feature of the dielectric composition according to the present embodiment. As a result, the resistivity at 200° C. is lowered; and the change ratio of the resistivity from the room temperature to 200° C. increases.

In addition, MgO, BaO, $B_2O_3$, $SiO_2$, and $P_2O_5$ are included as the first accessory component, and the total content of the first accessory component is 2.5 mol to 20.0 mol per 100 mol of the main component. As a result, it is possible to obtain the effect of suppressing increase and movement of the majority carrier electrons, which are considered to be the major cause of a decrease in resistivity; and as a result, good insulation can be obtained. When the total content is less than 2.5 mol or more than 20.0 mol, it is impossible to suppress the increase and movement of majority carrier electrons for the resistivity at 200° C. to be reduced. Therefore, the change ratio of the resistivity increases. In addition, the increase and movement of the majority carrier electrons cannot be suppressed effectively in a combination other than the above-described 5 oxides as the accessory component for the resistivity at room temperature to be reduced.

It is preferable that when the first accessory component is expressed by $aMgO-bBaO-cB_2O_3-dSiO_2-eP_2O_5$, a relationship of a, b, c, d, and e satisfies: $a+b+c+d+e=1.00$; $0.50 \le a \le 0.75$; $0.02 \le b \le 0.15$; $0.05 \le c \le 0.25$; $0.05 \le d \le 0.25$; and $0.02 \le e \le 0.15$. By satisfying the ranges, the effect of suppressing the increase and movement of the majority carrier electrons can be improved. Therefore, it is possible to further increase the resistivity at 200° C. and reduce the change ratio of the resistivity from room temperature to 200° C.

The above-described a, b, c, d, and e represent the molar ratio between corresponding compounds of the first accessory component.

It is preferable that the dielectric composition further contains at least one or more selected from: $La_2O_3$; $SnO_2$; $Y_2O_3$; $Sb_2O_3$; $Ta_2O_5$; and $Nb_2O_5$ as a secondary accessory component in a content of 0.5 mol to 5.0 mol per 100 mol of the main component. Accordingly, good insulation and an improved direct current withstand voltage at 200° C. can be obtained.

As a result, it is possible to achieve improvement in both of insulation and direct current withstand voltage.

In addition, the dielectric composition contains the secondary phase including MgO and $P_2O_5$. Containing the secondary phase including MgO and $P_2O_5$ means that the area occupied by the secondary phase is 2.0% or more when the total area of a cross section of the dielectric composition is defined as 100%.

In the dielectric composition containing the secondary phase including MgO and $P_2O_5$, it is preferable that the area occupied by the secondary phase is 2.0% to 15.0% when the total area of a cross section of the dielectric composition is defined as 100%. The secondary phase including MgO and $P_2O_5$ has the phosphate crystal structure of $3MgO \cdot P_2O_5$ system or (MgO.BaO)—$P_2O_5$ system. In addition, it is preferable that the secondary phase of the dielectric composition exists as a grain form; or a form of a segregation phase existing in a grain boundary, a grain boundary triple point or the like, with the content ratio of MgO and $P_2O_5$ at 90 mol % or more. As a result, the change ratio of the resistivity can be kept low in a wider temperature range from room temperature to 250° C. by containing the secondary phase at the predetermined amount.

The above-described area ratio can be measured in the same manner as the method described in the first embodiment.

As described above, the dielectric composition according to the present embodiment exhibits favorable characteristics in a high-temperature range. Thus, it can be suitably utilized in the temperature range (−55° C. to 200° C. or 250° C.) used in the SiC or GaN-based power device. In addition, it can be suitably used as an electronic part for noise elimination under severe environments such as an automobile engine room.

In the chemical formula $(K_{1-x}Na_x) Sr_2Nb_5O_{15}$, the molar ratio of the K site, the Sr site, the Nb site and the O site is basically 1:2:5:15. However, as long as it retains the tungsten bronze structure, the molar ratio may be increased or decreased in a certain degree.

In addition, the dielectric composition according to the present embodiment may contain minute impurities or the third accessory components, as long as it does not greatly degrade the good insulation, which is the effect of the present invention. For example, impurities include Mn, V, Cr or the like. Therefore, the content of the main component is not particularly limited, but is, for example, 70 mol % or more and less than 98 mol % with respect to the entire dielectric composition containing the main component.

Next, a method of producing the dielectric composition according to this embodiment will be described. As a method of producing the dielectric composition, a known method may be adopted. For example, a solid phase method or the like in which starting materials such as oxide powder and carbonate are mixed, and the resultant mixed powder is heat-treated and synthesized may be adopted.

The main component $(K_{1-x} Na_x) Sr_2Nb_5O_{15}$ can be prepared as described in the first embodiment.

For the first accessory component, MgO, $SiO_2$, $BaCO_3$, $B_2O_3$, and $P_2O_5$ powders having an average particle diameter of 1.0 μm or less are prepared as a starting material. In addition, $La_2O_3$, $SnO_2$, $Y_2O_3$, $Sb_2O_3$, $Ta_2O_5$ and $Nb_2O_5$ powders are prepared as a starting material of the second accessory component, if necessary. After weighing them to have a predetermined ratio, wet blending is performed for a predetermined time by using a ball mill or the like. After drying the mixed powder, heat treatment is performed in the air at 700° C. to 800° C. for 1 to 5 hours to prepare the calcined powder of the accessory component. Alternatively, the dried mixed power may be used without performing the heat treatment.

Thereafter, the resultant calcined powder of $(K_{1-x}Na_x) Sr_2Nb_5O_{15}$ and the calcined powder of accessory component or the mixed powder of the accessory component, are mixed and crushed to prepare a mixed powder having an average particle diameter of 0.5 μm to 2.0 μm.

Unless otherwise stated, the method of producing a laminated ceramic capacitor, which is explained as an example in the first embodiment, can be adopted as an example of a method of producing a laminated ceramic capacitor in the second embodiment without any modification.

The holding temperature at the time of calcining is preferably 1000° C. to 1400° C., more preferably 1100° C. to 1350° C. When the holding temperature is lower than the above-described range in the present embodiment, the densification becomes insufficient. When the holding temperature exceeds the above-described range, discontinuity of the electrode due to abnormal sintering of the internal electrode layer and increase of the change ratio with respect to the temperature of the capacitance due to diffusion of the internal electrode layer constituting material are likely to occur.

In addition, as the atmosphere for calcining, it is preferable to use a mixed gas of humidified $N_2$ and $H_2$; and calcining at an oxygen partial pressure of $10^{-2}$ to $10^{-9}$ Pa. More preferably, the oxygen partial pressure is $10^{-2}$ to $10^{-5}$ Pa.

Although the second embodiment of the present invention has been described above, the present invention is not limited to the above-described embodiment at all, and various modifications can be made without departing from the scope of the present invention.

EXAMPLES

The present invention will be described in more detail with reference to specific examples of the present invention below. However, the present invention is not limited to these examples. In the table, the sample marked with an asterisk (*) is outside the scope of this embodiment.

First Example

First, for the main component $(K_{1-x}Na_x) Sr_2Nb_5O_{15}$, $K_2CO_3$, $Na_2CO_3$, $SrCO_3$ and $Nb_2O_5$ powders having the average particle size of 1.0 μm or less were prepared as starting materials; and these powders were weighted so as to satisfy the mol ratios described in each sample number. Thereafter, wet mixing was carried out for 17 hours by a ball mill using ethanol as a dispersion medium. Thereafter, the obtained mixture was dried to obtain a mixed raw material powder. Thereafter, heat treatment was performed in the air at the holding temperature of 950° C. and the holding time of 24 hours to obtain the calcined powder of the main component.

Next, for other inclusions (secondary phase, accessory component, or the like), MgO, $SiO_2$, $BaCO_3$, $B_2O_3$, $La_2O_3$, $SnO_2$, $Y_2O_3$, $Sb_2O_3$, $Ta_2O_5$, and $Nb_2O_5$ powders having an average particle size of 1.0 μM or less were prepared as stating materials; and these powders were weighed so as to have a predetermined ratio described in each sample number in Table 1. Thereafter, wet mixing was carried out for 17 hours by a ball mill using ethanol as a dispersion medium. Thereafter, the mixed powder was dried at 80° C. for 24 hours and then heat-treated at 750° C. for 3 hours in the air to prepare the calcined powder of inclusions other than the main component. Thereafter, the other calcined powders were weighted so as to obtain the blending ratio described in each sample number in Table 1 with respect to 100 mol of the prepared $(K_{1-x}Na_x)Sr_2Nb_5O_{15}$ calcined powder. Then, the mixed calcined powder having the average particle size of 0.5 μm to 2.0 μm was prepared by mixing and crushing the calcined powder of $(K_{1-x}Na_x)Sr_2Nb_5O_{15}$ and the other calcine powders with a ball mill for 24 hours.

TABLE 1

| Sample No. | Main component (mol ratio) | | | | Other inclusions (mol) | | | | | | | | | |
|---|---|---|---|---|---|---|---|---|---|---|---|---|---|---|
| | $K_2CO_3$ | $Na_2CO_3$ | $SrCO_3$ | $Nb_2O_5$ | $SiO_2$ | MgO | $BaCO_3$ | $B_2O_3$ | $La_2O_3$ | $SnO_2$ | $Y_2O_3$ | $Sb_2O_3$ | $Ta_2O_5$ | $Nb_2O_5$ |
| No. 1* | 0.500 | 0.000 | 2.000 | 2.500 | 13.0 | 0.0 | 3.9 | 1.7 | 3.0 | 0.0 | 2.0 | 0.0 | 2.0 | 1.0 |
| No. 2* | 0.450 | 0.050 | 2.000 | 2.500 | 10.0 | 0.0 | 3.0 | 2.0 | 3.0 | 1.0 | 0.0 | 2.0 | 1.0 | 1.0 |
| No. 3* | 0.375 | 0.125 | 2.000 | 2.500 | 5.0 | 0.0 | 1.5 | 1.0 | 1.0 | 1.5 | 0.5 | 0.0 | 1.5 | 0.5 |
| No. 4* | 0.300 | 0.200 | 2.000 | 2.500 | 2.5 | 0.0 | 0.8 | 0.5 | 0.3 | 0.5 | 0.0 | 0.8 | 0.3 | 0.3 |
| No. 5* | 0.250 | 0.250 | 2.000 | 2.500 | 1.7 | 0.0 | 0.5 | 0.3 | 0.3 | 0.0 | 0.2 | 0.3 | 0.2 | 0.3 |
| No. 6* | 0.200 | 0.300 | 2.000 | 2.500 | 5.0 | 0.0 | 1.5 | 1.0 | 1.5 | 0.5 | 0.5 | 0.5 | 0.5 | 0.5 |
| No. 7 | 0.500 | 0.000 | 2.000 | 2.500 | 13.0 | 9.1 | 3.9 | 0.0 | 3.0 | 0.0 | 2.0 | 0.0 | 2.0 | 1.0 |
| No. 8 | 0.450 | 0.050 | 2.000 | 2.500 | 13.0 | 9.1 | 0.0 | 2.6 | 3.0 | 1.0 | 0.0 | 2.0 | 1.0 | 1.0 |
| No. 9 | 0.375 | 0.125 | 2.000 | 2.500 | 0.0 | 9.1 | 3.9 | 2.6 | 1.0 | 3.0 | 1.0 | 0.0 | 3.0 | 1.0 |
| No. 10 | 0.300 | 0.200 | 2.000 | 2.500 | 13.0 | 9.1 | 3.9 | 2.6 | 1.0 | 2.0 | 0.0 | 3.0 | 1.0 | 1.0 |
| No. 11 | 0.250 | 0.250 | 2.000 | 2.500 | 13.0 | 9.1 | 3.9 | 2.6 | 2.0 | 0.0 | 1.0 | 2.0 | 1.0 | 2.0 |
| No. 12* | 0.200 | 0.300 | 2.000 | 2.500 | 13.0 | 9.1 | 3.9 | 2.6 | 3.0 | 1.0 | 1.0 | 1.0 | 1.0 | 1.0 |
| No. 13 | 0.375 | 0.125 | 2.000 | 2.500 | 14.3 | 14.3 | 3.9 | 2.6 | 1.0 | 0.0 | 1.0 | 0.0 | 1.0 | 0.0 |
| No. 14 | 0.375 | 0.125 | 2.000 | 2.500 | 14.3 | 7.8 | 7.8 | 2.6 | 1.0 | 1.0 | 0.0 | 1.0 | 1.0 | 1.0 |
| No. 15 | 0.375 | 0.125 | 2.000 | 2.500 | 15.6 | 3.9 | 15.6 | 1.3 | 1.0 | 0.0 | 1.0 | 0.0 | 0.0 | 0.0 |
| No. 16 | 0.500 | 0.000 | 2.000 | 2.500 | 10.0 | 7.0 | 3.0 | 2.0 | 3.0 | 0.0 | 2.0 | 0.0 | 2.0 | 1.0 |
| No. 17 | 0.450 | 0.050 | 2.000 | 2.500 | 10.0 | 7.0 | 3.0 | 2.0 | 3.0 | 1.0 | 0.0 | 2.0 | 1.0 | 1.0 |
| No. 18 | 0.375 | 0.125 | 2.000 | 2.500 | 10.0 | 7.0 | 3.0 | 2.0 | 1.0 | 2.0 | 1.0 | 0.0 | 3.0 | 1.0 |
| No. 19 | 0.300 | 0.200 | 2.000 | 2.500 | 10.0 | 7.0 | 3.0 | 2.0 | 1.0 | 2.0 | 0.0 | 3.0 | 1.0 | 1.0 |
| No. 20 | 0.250 | 0.250 | 2.000 | 2.500 | 10.0 | 7.0 | 3.0 | 0.0 | 2.0 | 0.0 | 1.0 | 2.0 | 1.0 | 2.0 |
| No. 21* | 0.200 | 0.300 | 2.000 | 2.500 | 10.0 | 7.0 | 3.0 | 2.0 | 3.0 | 1.0 | 1.0 | 1.0 | 1.0 | 1.0 |
| No. 22 | 0.375 | 0.125 | 2.000 | 2.500 | 11.0 | 11.0 | 3.0 | 2.0 | 1.0 | 0.0 | 1.0 | 0.0 | 1.0 | 0.0 |
| No. 23 | 0.375 | 0.125 | 2.000 | 2.500 | 11.0 | 6.0 | 6.0 | 2.0 | 4.0 | 0.0 | 0.0 | 0.0 | 0.0 | 0.0 |
| No. 24 | 0.375 | 0.125 | 2.000 | 2.500 | 12.0 | 3.0 | 12.0 | 1.0 | 1.0 | 0.0 | 1.0 | 0.0 | 0.0 | 0.0 |
| No. 25 | 0.500 | 0.000 | 2.000 | 2.500 | 5.0 | 3.5 | 1.5 | 1.0 | 1.5 | 0.0 | 1.0 | 0.0 | 1.0 | 0.5 |
| No. 26 | 0.450 | 0.050 | 2.000 | 2.500 | 0.0 | 3.5 | 1.5 | 1.0 | 1.5 | 0.5 | 0.0 | 1.0 | 0.5 | 0.5 |
| No. 27 | 0.375 | 0.125 | 2.000 | 2.500 | 5.0 | 3.5 | 1.5 | 1.0 | 0.5 | 1.5 | 0.5 | 0.0 | 1.0 | 0.5 |
| No. 28 | 0.300 | 0.200 | 2.000 | 2.500 | 5.0 | 3.5 | 1.5 | 1.0 | 0.0 | 1.0 | 0.5 | 1.5 | 0.5 | 0.5 |
| No. 29 | 0.250 | 0.250 | 2.000 | 2.500 | 5.0 | 3.5 | 1.5 | 1.0 | 1.0 | 0.0 | 0.5 | 1.0 | 0.5 | 1.0 |
| No. 30* | 0.200 | 0.300 | 2.000 | 2.500 | 5.0 | 3.5 | 1.5 | 1.0 | 1.5 | 0.5 | 0.5 | 0.5 | 0.5 | 0.5 |
| No. 31 | 0.375 | 0.125 | 2.000 | 2.500 | 5.5 | 5.5 | 1.5 | 1.0 | 0.5 | 0.0 | 0.5 | 0.0 | 0.5 | 0.0 |
| No. 32 | 0.375 | 0.125 | 2.000 | 2.500 | 5.5 | 3.0 | 3.0 | 1.0 | 0.5 | 0.5 | 0.0 | 0.5 | 0.5 | 0.5 |
| No. 33 | 0.375 | 0.125 | 2.000 | 2.500 | 6.0 | 1.5 | 6.0 | 0.5 | 0.0 | 0.0 | 0.5 | 0.0 | 0.0 | 0.0 |
| No. 34 | 0.500 | 0.000 | 2.000 | 2.500 | 2.5 | 1.8 | 0.8 | 0.5 | 0.8 | 0.0 | 0.5 | 0.0 | 0.5 | 0.3 |
| No. 35 | 0.450 | 0.050 | 2.000 | 2.500 | 2.5 | 1.8 | 0.8 | 0.5 | 0.8 | 0.3 | 0.0 | 0.5 | 0.3 | 0.3 |
| No. 36 | 0.375 | 0.125 | 2.000 | 2.500 | 2.5 | 1.8 | 0.0 | 0.0 | 0.8 | 0.8 | 0.3 | 0.0 | 0.0 | 0.3 |
| No. 37 | 0.300 | 0.200 | 2.000 | 2.500 | 2.5 | 1.8 | 0.8 | 0.5 | 0.3 | 0.5 | 0.0 | 0.8 | 0.3 | 0.3 |
| No. 38 | 0.250 | 0.250 | 2.000 | 2.500 | 2.5 | 1.8 | 0.8 | 0.5 | 0.5 | 0.0 | 0.3 | 0.5 | 0.3 | 0.5 |
| No. 39* | 0.200 | 0.300 | 2.000 | 2.500 | 2.5 | 1.8 | 0.8 | 0.5 | 0.8 | 0.3 | 0.3 | 0.3 | 0.3 | 0.3 |
| No. 40 | 0.375 | 0.125 | 2.000 | 2.500 | 2.8 | 2.8 | 0.8 | 0.5 | 0.3 | 0.0 | 0.3 | 0.0 | 0.3 | 0.0 |
| No. 41 | 0.375 | 0.125 | 2.000 | 2.500 | 2.8 | 1.5 | 1.5 | 0.5 | 1.0 | 0.0 | 0.0 | 0.0 | 0.0 | 0.0 |
| No. 42 | 0.375 | 0.125 | 2.000 | 2.500 | 3.0 | 0.8 | 3.0 | 0.3 | 0.3 | 0.0 | 0.3 | 0.0 | 0.0 | 0.0 |
| No. 43 | 0.500 | 0.000 | 2.000 | 2.500 | 1.7 | 1.2 | 0.5 | 0.3 | 0.5 | 0.0 | 0.3 | 0.0 | 0.3 | 0.2 |
| No. 44 | 0.450 | 0.050 | 2.000 | 2.500 | 1.7 | 1.2 | 0.5 | 0.3 | 0.0 | 0.2 | 0.5 | 0.3 | 0.2 | 0.2 |
| No. 45 | 0.375 | 0.125 | 2.000 | 2.500 | 1.7 | 1.2 | 0.5 | 0.3 | 0.5 | 0.0 | 0.2 | 0.0 | 0.5 | 0.2 |
| No. 46 | 0.300 | 0.200 | 2.000 | 2.500 | 1.7 | 1.2 | 0.5 | 0.3 | 0.2 | 0.3 | 0.0 | 0.5 | 0.2 | 0.2 |
| No. 47 | 0.250 | 0.250 | 2.000 | 2.500 | 1.7 | 1.2 | 0.5 | 0.3 | 0.3 | 0.0 | 0.2 | 0.3 | 0.2 | 0.3 |
| No. 48* | 0.200 | 0.300 | 2.000 | 2.500 | 1.7 | 1.2 | 0.5 | 0.3 | 0.5 | 0.2 | 0.2 | 0.2 | 0.2 | 0.2 |
| No. 49 | 0.375 | 0.125 | 2.000 | 2.500 | 1.8 | 1.8 | 0.5 | 0.3 | 0.2 | 0.0 | 0.2 | 0.0 | 0.2 | 0.0 |
| No. 50 | 0.375 | 0.125 | 2.000 | 2.500 | 1.8 | 1.0 | 1.0 | 0.3 | 0.2 | 0.2 | 0.0 | 0.2 | 0.2 | 0.2 |
| No. 51 | 0.375 | 0.125 | 2.000 | 2.500 | 2.0 | 0.5 | 2.0 | 0.2 | 0.2 | 0.0 | 0.2 | 0.0 | 0.0 | 0.0 |

Seven hundred grams of the solvent, which was obtained by mixing: the toluene +ethanol solution; the plasticizer; and the dispersant, at a ratio of 90:6:4, was added to 1000 g of the mixed calcined powder of the dielectric composition obtained as described above. Then, the mixture was kneaded by a usual well-known dispersion method and dispersed for 2 hours using a basket mill to prepare the dielectric layer paste. The viscosity of these pastes was adjusted to about 200 cps.

As the raw material of the inner electrode layer, Ni having an average grain diameter of 0.2 μm and oxides of Al and Si having the thickness of 0.1 μm or less were prepared. These powders were weighted so that the total amount of Al and Si as accessory components became 5% by mass relative to Ni. Thereafter, heat treatment was performed in a mixed gas of $N_2$ and $H_2$ humidified at 1200° C. or more; and the obtained materials was crushed using a ball mill or the like to prepare raw material powders having the average grain diameter of 0.20 μm.

The paste for the inner electrode layer was obtained by kneading 100 mass % of the above-described raw material powder, 30 mass % of an organic vehicle (8 mass % of ethyl cellulose resin dissolved in 92 mass % of butyl carbitol), and 8 mass % of butyl carbitol to turn the mixture into a paste form.

Using the prepared dielectric layer paste, a green sheet was formed on the PET film so that the thickness after drying was 12 μm. Subsequently, the inner electrode layer was printed on the inner electrode layer paste in a prescribed pattern, and then the sheet was peeled off from the PET film to prepare a green sheet having an inner electrode layer. Subsequently, a plurality of green sheets having inner electrode layers were laminated and pressed and bonded to form a green laminate. The green laminate was cut into a predetermined size to obtain a green chip.

Next, the obtained green chip was subjected to de-binder treatment, calcining, and annealing treatment to obtain a laminated ceramic sintered body. Conditions for the de-binder treatment, calcining and annealing are as follows. Wetter was used for humidifying each atmospheric gas.

(De-binder Treatment)
  Heating rate: 100° C./hour
  Holding temperature: 400° C.
  Temperature holding time: 8.0 hours
  Ambient gas: Humidified mixed gas of $N_2$ and $H_2$ (Calcining)
  Heating rate: 1000° C./hour
  Holding temperature: 1100° C. to 1300° C.
  Temperature holding time: 1.0 hours
  Cooling rate: 200° C./hour
  Ambient gas: Humidified mixed gas of $N_2$ and $H_2$
  Oxygen partial pressure: $10^{-5}$ (Annealing Treatment)
  Holding temperature: 800° C. to 1000° C.
  Temperature holding time: 2.0 hours
  Raising temperature, cooling rate: 200° C./hour
  Ambient gas: Humidified $N_2$ gas Composition analysis of each sample was conducted using ICP emission spectroscopy for each of the laminated ceramic sintered bodies. It was confirmed that the each of the obtained laminated ceramic sintered bodies had almost the same value as the dielectric composition described in Table 1.

After grinding the end face of the obtained laminated ceramic sintered body by sandblasting, an In—Ga eutectic alloy was applied as an external electrode, and sample Nos. 1 to 51 of the laminated ceramic capacitors having the same shape as the laminated ceramic capacitor shown in FIG. 1 were obtained. The size of each of the laminated ceramic capacitor samples obtained was 3.2 mm×1.6 mm×1.2 mm. The thickness of the dielectric layer was 10 μm. The thickness of the inner electrode layer was 2 μm. The number of the dielectric layers sandwiched between the inner electrode layers was 50.

The resistivity at room temperature and at 250° C.; the direct current withstand voltage at 250° C.; and the area ratio of the secondary phase by image analysis, were measured and evaluated in the laminated ceramic capacitors of the sample Nos. 1 to 51 by the methods described below. Results are shown in Table 2.

[Resistivity at Room Temperature and at 250° C.]

Insulation resistance was measured in the laminated ceramic capacitor samples at 250° C. with the digital resistance meter (R8340 manufactured by ADVANTEST Co., Ltd.) under the condition of the measurement voltage of 50V (electric field strength 5V/μm) and the measurement time of 60 seconds. The values of the resistivity were calculated from the area of the electrode of the laminated ceramic capacitor and the thickness of the dielectric. High resistivity is preferable. It was evaluated as good when the resistivity was $5.00 \times 10^{11}$ Ωm or more at room temperature and $1.00 \times 10^{11}$ Ωm or more at 250° C.

In Table 2, the resistivity is logarithmically represented. When $5.00 \times 10^{11}$ is logarithmically displayed, it is 11.7. When $1.00 \times 10^{10}$ is logarithmically displayed, it is 10.0.

[Change Ratio of the Resistivity]

As the change ratio of the resistivity, the change ratio of the logarithmic of the resistivity at 250° C. ($\rho_{(250° C.)}$) with respect to the logarithmic of the resistivity at room temperature ($\rho_{(RT)}$) was calculated by using the following formula (1) indicated below.

Change ratio (%)=

$$[\text{Log}(\rho_{(250° C.)}) - \text{Log}(\rho_{(RT)})]/\text{Log}(\rho_{(RT)}) \times 100 \quad (1)$$

It is preferable that the change ratio of the resistivity is as low as possible, and it was evaluated as good when it was −20% or less, more preferably −15% or less.

[DC Withstand Voltage]

A DC voltage was applied to the multilayer ceramic capacitor sample at 250° C. at a rate of 100 V/sec boosting rate. The DC withstand voltage was defined as the voltage where the leakage current exceeded 10 mA. The DC withstand voltage is preferably 50 V/μm or more, more preferably 100 V/μm or more. More preferably, the DC withstand voltage is 150 V/μm or more.

[Area Ratio of the Secondary Phase by Image Analysis]

Elemental mapping was performed by EPMA (Electron Probe Micro Analyzer) on the polished cross section of the dielectric layer in the laminated ceramic capacitors obtained by calcining. The field of view of the mapping was 10 μm×10 μm, and mapping was performed over 5 fields or more for each sample. By using the elemental mapping obtained by the above-described method, areas of: Mg and Si, which were the elements of $2\text{MgO.SiO}_2$; Mg, Si and Ba, which were the elements of $\text{BaO.2MgO.2SiO}_2$; and Mg and B, which were the elements of $2\text{MgO.B}_2\text{O}_3$, were identified. Then, the area ratio occupied by the entire secondary phase was calculated by calculating the area ratio of each compound using the average area from results over 5 fields of view. It was evaluated as good when the area occupied by the secondary phase was 1.5% to 20.0% in order to obtain good resistivity and change ratio in the present example.

TABLE 2

| Sample No. | Main component Substitution amount x | Secondary phase $2\text{MgO·SiO}_2$ | $\text{BaO·2MgO·2SiO}_2$ | $2\text{MgO·B}_2\text{O}_3$ | Area (%) | Accessory component (mol) | Resistivity at 25° C. Log(ρ/Ωm) | Resistivity at 250° C. Log(ρ/Ωm) | Change ratio of the resistivity (%) | Direct current withstand voltage (V/μm) |
|---|---|---|---|---|---|---|---|---|---|---|
| No. 1* | 0.00 | B | B | B | 0 | 8.0 | 9.5 | 6.8 | −28 | 45 |
| No. 2* | 0.10 | B | B | B | 0 | 8.0 | 9.0 | 7.0 | −22 | 40 |
| No. 3* | 0.25 | B | B | B | 0 | 5.0 | 10.1 | 7.5 | −26 | 40 |
| No. 4* | 0.40 | B | B | B | 0 | 2.0 | 9.3 | 6.8 | −27 | 35 |
| No. 5* | 0.50 | B | B | B | 0 | 1.3 | 8.5 | 5.5 | −35 | 40 |
| No. 6* | 0.60 | B | B | B | 0 | 4.0 | 8.4 | 5.0 | −40 | 45 |
| No. 7 | 0.00 | A | A | B | 22.9 | 8.0 | 12.1 | 10.2 | −16 | 85 |
| No. 8 | 0.10 | A | B | A | 21.5 | 8.0 | 12.2 | 10.3 | −16 | 80 |
| No. 9 | 0.25 | B | B | A | 20.0 | 9.0 | 12.6 | 11.0 | −13 | 80 |
| No. 10 | 0.40 | A | A | A | 24.3 | 8.0 | 12.2 | 10.1 | −17 | 85 |
| No. 11 | 0.50 | A | A | A | 21.2 | 8.0 | 12.3 | 10.0 | −19 | 80 |
| No. 12* | 0.60 | A | A | A | 20.0 | 8.0 | 10.5 | 7.0 | −18 | 45 |
| No. 13 | 0.25 | A | A | A | 26.3 | 3.0 | 12.3 | 10.3 | −16 | 100 |

TABLE 2-continued

| Sample No. | Main component Substi- tution amount x | Secondary phase 2MgO•SiO$_2$ | Secondary phase BaO•2MgO•2SiO$_2$ | Secondary phase 2MgO•B$_2$O$_3$ | Area (%) | Accessory component (mol) | Resistivity at 25° C. Log(ρ/Ωm) | Resistivity at 250° C. Log(ρ/Ωm) | Change ratio of the resistivity (%) | Direct current withstand voltage (V/μm) |
|---|---|---|---|---|---|---|---|---|---|---|
| No. 14 | 0.25 | A | A | A | 26.0 | 5.0 | 12.2 | 10.2 | −16 | 105 |
| No. 15 | 0.25 | A | A | A | 27.3 | 2.0 | 12.1 | 10.1 | −17 | 110 |
| No. 16 | 0.00 | A | A | A | 17.6 | 8.0 | 12.6 | 11.1 | −12 | 85 |
| No. 17 | 0.10 | A | A | A | 16.5 | 8.0 | 12.7 | 11.2 | −12 | 90 |
| No. 18 | 0.25 | A | A | A | 15.4 | 8.0 | 12.8 | 11.4 | −11 | 85 |
| No. 19 | 0.40 | A | A | A | 18.7 | 8.0 | 12.6 | 11.3 | −10 | 80 |
| No. 20 | 0.50 | A | A | B | 14.3 | 8.0 | 12.5 | 11.0 | −12 | 80 |
| No. 21* | 0.60 | A | A | A | 15.4 | 8.0 | 11.0 | 7.5 | −32 | 40 |
| No. 22 | 0.25 | A | A | A | 18.9 | 3.0 | 12.5 | 11.2 | −10 | 90 |
| No. 23 | 0.25 | A | A | A | 20.0 | 4.0 | 12.7 | 11.1 | −13 | 105 |
| No. 24 | 0.25 | A | A | A | 19.6 | 2.0 | 12.6 | 11.2 | −11 | 110 |
| No. 25 | 0.00 | A | A | A | 8.8 | 4.0 | 12.8 | 11.0 | −14 | 105 |
| No. 26 | 0.10 | B | B | A | 8.3 | 4.0 | 12.7 | 11.2 | −12 | 110 |
| No. 27 | 0.25 | A | A | A | 7.7 | 4.0 | 12.5 | 11.1 | −11 | 115 |
| No. 28 | 0.40 | A | A | A | 9.4 | 4.0 | 12.5 | 11.4 | −9 | 90 |
| No. 29 | 0.50 | A | A | A | 7.2 | 4.0 | 12.7 | 11.2 | −12 | 105 |
| No. 30* | 0.60 | A | A | A | 7.7 | 4.0 | 11.2 | 8.0 | −29 | 45 |
| No. 31 | 0.25 | A | A | A | 10.1 | 1.5 | 12.7 | 11.2 | −12 | 105 |
| No. 32 | 0.25 | A | A | A | 10.0 | 2.5 | 12.5 | 11.0 | −12 | 110 |
| No. 33 | 0.25 | A | A | A | 10.5 | 0.5 | 12.5 | 11.2 | −10 | 85 |
| No. 34 | 0.00 | A | A | A | 4.4 | 2.0 | 12.7 | 11.0 | −13 | 110 |
| No. 35 | 0.10 | A | A | A | 4.1 | 2.0 | 12.6 | 11.2 | −11 | 110 |
| No. 36 | 0.25 | A | B | B | 3.9 | 2.0 | 12.7 | 11.1 | −13 | 105 |
| No. 37 | 0.40 | A | A | A | 4.7 | 2.0 | 12.5 | 11.2 | −10 | 110 |
| No. 38 | 0.50 | A | A | A | 3.6 | 2.0 | 12.5 | 11.0 | −12 | 100 |
| No. 39* | 0.60 | A | A | A | 3.9 | 2.0 | 10.2 | 6.5 | −36 | 40 |
| No. 40 | 0.25 | A | A | A | 5.1 | 0.8 | 12.7 | 11.0 | −13 | 100 |
| No. 41 | 0.25 | A | A | A | 5.0 | 1.0 | 12.6 | 11.2 | −11 | 90 |
| No. 42 | 0.25 | A | A | A | 5.3 | 0.5 | 12.5 | 11.1 | −11 | 115 |
| No. 43 | 0.00 | A | A | A | 1.8 | 1.3 | 12.5 | 11.2 | −10 | 105 |
| No. 44 | 0.10 | A | A | A | 1.7 | 1.3 | 12.6 | 11.0 | −13 | 85 |
| No. 45 | 0.25 | A | A | A | 1.5 | 1.3 | 12.6 | 11.2 | −11 | 100 |
| No. 46 | 0.40 | A | A | A | 2.0 | 1.3 | 12.8 | 11.0 | −14 | 105 |
| No. 47 | 0.50 | A | A | A | 1.7 | 1.3 | 12.5 | 11.2 | −10 | 100 |
| No. 48* | 0.60 | A | A | A | 1.5 | 1.3 | 9.5 | 5.5 | −42 | 45 |
| No. 49 | 0.25 | A | A | A | 2.0 | 0.5 | 12.5 | 11.2 | −10 | 105 |
| No. 50 | 0.25 | A | A | A | 1.7 | 0.8 | 12.6 | 11.2 | −11 | 105 |
| No. 51 | 0.25 | A | A | A | 2.1 | 0.3 | 12.6 | 11.0 | −13 | 85 |

In the table, "A" means that the indicated secondary phase was present (the area ratio of the secondary phase was 1.5% or more); and "B" means that the indicated secondary phase was absent (the area ratio of the secondary phase was less than 1.5%).

According to the results shown in Table 2, it was confirmed that the logarithmic of the resistivity at room temperature, Log($\rho_{(RT)}$, was 11.7 or more and the logarithmic of the resistivity at 250° C., Log($\rho_{(250° C.)}$), was 10.0 or more; and the change ratio of the resistivity was low at −20% in the laminated ceramic capacitors falling in the ranges of the present embodiment among the samples Nos. 1 to 51.

On the other hand, the effect of suppressing the increase and movement of the majority carrier electrons, which were considered to be the major cause of reduction of the resistivity was hard to obtain in the sample Nos. 6, 12, 21, 30, 39 and 48, since the value x in the chemical formula (K$_{1-x}$Na$_x$)Sr$_2$Nb$_5$O$_{15}$ exceeded 0.50, which was outside of the range of the present embodiment. Accordingly, it was confirmed that the logarithmic of the resistivity at room temperature, Log($\rho_{(RT)}$, was low at less than 11.7 and the logarithmic of the resistivity at 250° C., Log($\rho_{(250° C.)}$), was low at less than 10.0; and the change ratio of the resistivity exceeded −20% in the laminated ceramic capacitors of in the sample Nos. 6, 12, 21, 30, 39 and 48.

In addition, it was confirmed that the resistivity at room temperature and at 250° C. was low; and the change ratio of the resistivity exceeded −20% in the samples Nos. 1 to 5 as in the cases described above since the secondary phase (2MgO.SiO$_2$, BaO.2MgO.2SiO$_2$ and 2MgO.B$_2$O$_3$) which was the unique feature of the present embodiment was not contained in the samples Nos. 1 to 5.

In addition, it was confirmed that the logarithmic of the resistivity at room temperature, Log($\rho_{(RT)}$, was high at 12.5 or more and the logarithmic of the resistivity at 250° C., Log($\rho_{(250° C.)}$), was high at 11.0 or more. Furthermore, it was confirmed that an even lower change ratio of the resistivity of −15% could be obtained.

In addition, it was confirmed that the direct current withstand voltage at 250° C. could be improved in the laminated ceramic capacitors containing at least one or more selected from: La$_2$O$_3$; SnO$_2$; Y$_2$O$_3$; Sb$_2$O$_3$; Ta$_2$O; and Nb$_2$O$_5$ in the content of 0.5 mol to 5.0 mol per 100 mol of the main component.

In addition, the logarithmic of the resistivity at room temperature, Log($\rho_{(RT)}$, was high at 12.5 or more and the logarithmic of the resistivity at 250° C., Log($\rho_{(250° C.)}$). was high at 11.0 or more; the change ratio of the resistivity was even lower at −15% or less; and the direct current withstand voltage at 250° C. was high in the laminated ceramic capacitors, in which the area ratio occupied by the secondary phase was 1.5% to 20.0%; and at least one or more selected from: La$_2$O$_3$; SnO$_2$; Y$_2$O$_3$; Sb$_2$O$_3$; Ta$_2$O; and Nb$_2$O$_5$ was contained in the content of 0.5 mol to 5.0 mol per 100 mol of the main component. Accordingly, it was confirmed that both of good insulation property and high direct current withstand voltage can be obtained at the same time by controlling the area ratio of the secondary phase and the kind and content of the accessory component.

Good insulation property could be obtained in the laminated ceramic capacitors of the sample Nos. 7 to 10, in which different secondary phases were present.

Second Example

Example 2-1

First, the main component $(K_{1-x}Na_x)Sr_2Nb_5O_{15}$ was obtained in the same manner as in first example.

Next, for the first and second accessory components, MgO, $SiO_2$, $BaCO_3$, $B_2O_3$, $P_2O_5$, $La_2O_3$, $SnO_2$, $Y_2O_3$, $Sb_2O_3$, $Ta_2O_5$, and $Nb_2O_5$ powders having an average particle size of 1.0 μm or less were prepared as stating materials; and these powders were weighed so as to have the ratio described in each sample number in Table 3. Thereafter, wet mixing was carried out for 17 hours by a ball mill using ethanol as a dispersion medium. Thereafter, the mixed powder was dried at 80° C. for 24 hours and then heat-treated at 750° C. to 900° C. for 3 hours in the air to prepare the calcined powders of the accessory components. Thereafter, the calcined powers of the accessory components were weighted so as to obtain the blending ratio described in each sample number in Table 3 with respect to 100 mol of the prepared $(K_{1-x}Na_x)Sr_2Nb_5O_{15}$ calcined powder. Then, the mixed calcined powder having the average particle size of 0.5 μM to 2.0 μm was prepared by mixing and crushing the calcined powders of $(K_{1-x}Na_x)Sr_2Nb_5O_{15}$ and the accessory components with a ball mill for 24 hours.

TABLE 3

| Sample No. | Main component (mol ratio) | | | | Accessory component (mol) | | | | | | | | | | |
|---|---|---|---|---|---|---|---|---|---|---|---|---|---|---|---|
| | $K_2CO_3$ | $Na_2CO_3$ | $SrCO_3$ | $Nb_2O_5$ | MgO | $BaCO_3$ | $B_2O_3$ | $SiO_2$ | $P_2O_5$ | $La_2O_3$ | $SnO_2$ | $Y_2O_3$ | $Sb_2O_3$ | $Ta_2O_5$ | $Nb_2O_5$ |
| No. 101 | 0.50 | 0.00 | 2.00 | 2.50 | 4.00 | 4.00 | 4.00 | 4.00 | 4.00 | 2.00 | 1.00 | 1.00 | 1.00 | 1.00 | 1.00 |
| No. 102 | 0.45 | 0.05 | 2.00 | 2.50 | 4.50 | 3.00 | 1.50 | 3.00 | 3.00 | 2.00 | 1.00 | 1.00 | 1.00 | 1.00 | 1.00 |
| No. 103 | 0.40 | 0.10 | 2.00 | 2.50 | 8.00 | 6.00 | 2.00 | 2.00 | 2.00 | 2.00 | 1.00 | 1.00 | 1.00 | 1.00 | 1.00 |
| No. 104 | 0.30 | 0.20 | 2.00 | 2.50 | 2.25 | 0.50 | 0.50 | 1.50 | 0.25 | 2.00 | 1.00 | 1.00 | 1.00 | 1.00 | 1.00 |
| No. 105* | 0.25 | 0.25 | 2.00 | 2.50 | 6.00 | 2.00 | 2.00 | 8.00 | 2.00 | 2.00 | 1.00 | 1.00 | 1.00 | 1.00 | 1.00 |
| No. 106 | 0.50 | 0.00 | 2.00 | 2.50 | 3.00 | 2.00 | 1.00 | 2.00 | 2.00 | 2.00 | 1.00 | 1.00 | 1.00 | 1.00 | 1.00 |
| No. 107 | 0.45 | 0.05 | 2.00 | 2.50 | 1.00 | 0.75 | 0.25 | 0.25 | 0.25 | 0.00 | 0.00 | 0.00 | 0.00 | 0.00 | 0.00 |
| No. 108 | 0.40 | 0.10 | 2.00 | 2.50 | 1.00 | 1.00 | 1.00 | 1.00 | 1.00 | 2.00 | 1.00 | 1.00 | 1.00 | 1.00 | 1.00 |
| No. 109 | 0.30 | 0.20 | 2.00 | 2.50 | 0.75 | 0.25 | 0.25 | 1.00 | 0.25 | 2.00 | 1.00 | 1.00 | 1.00 | 1.00 | 1.00 |
| No. 110* | 0.25 | 0.25 | 2.00 | 2.50 | 1.13 | 0.25 | 0.25 | 0.75 | 0.13 | 2.00 | 1.00 | 1.00 | 1.00 | 1.00 | 1.00 |
| No. 111* | 0.50 | 0.00 | 2.00 | 2.50 | 13.50 | 3.00 | 3.00 | 9.00 | 1.50 | 2.00 | 1.00 | 1.00 | 1.00 | 1.00 | 1.00 |
| No. 112* | 0.45 | 0.05 | 2.00 | 2.50 | 9.00 | 3.00 | 3.00 | 12.00 | 3.00 | 2.00 | 1.00 | 1.00 | 1.00 | 1.00 | 1.00 |
| No. 113* | 0.40 | 0.10 | 2.00 | 2.50 | 0.60 | 0.40 | 0.20 | 0.40 | 0.40 | 2.00 | 1.00 | 1.00 | 1.00 | 1.00 | 1.00 |
| No. 114* | 0.30 | 0.20 | 2.00 | 2.50 | 0.80 | 0.60 | 0.20 | 0.20 | 0.20 | 2.00 | 1.00 | 1.00 | 1.00 | 1.00 | 1.00 |
| No. 115* | 0.25 | 0.25 | 2.00 | 2.50 | 6.00 | 6.00 | 6.00 | 6.00 | 6.00 | 2.00 | 1.00 | 1.00 | 1.00 | 1.00 | 1.00 |
| No. 116* | 0.50 | 0.00 | 2.00 | 2.50 | 0.00 | 4.00 | 8.00 | 4.00 | 4.00 | 2.00 | 1.00 | 1.00 | 1.00 | 1.00 | 1.00 |
| No. 117* | 0.45 | 0.05 | 2.00 | 2.50 | 1.25 | 0.00 | 0.25 | 0.50 | 0.50 | 2.00 | 1.00 | 1.00 | 1.00 | 1.00 | 1.00 |
| No. 118* | 0.40 | 0.10 | 2.00 | 2.50 | 8.00 | 6.00 | 0.00 | 4.00 | 2.00 | 2.00 | 1.00 | 1.00 | 1.00 | 1.00 | 1.00 |
| No. 119* | 0.30 | 0.20 | 2.00 | 2.50 | 1.13 | 0.50 | 0.50 | 0.00 | 0.38 | 2.00 | 1.00 | 1.00 | 1.00 | 1.00 | 1.00 |
| No. 120* | 0.40 | 0.10 | 2.00 | 2.50 | 6.00 | 3.00 | 3.00 | 8.00 | 0.00 | 2.00 | 1.00 | 1.00 | 1.00 | 1.00 | 1.00 |
| No. 121 | 0.50 | 0.00 | 2.00 | 2.50 | 8.00 | 3.00 | 4.00 | 3.00 | 2.00 | 2.00 | 1.00 | 1.00 | 1.00 | 1.00 | 1.00 |
| No. 122 | 0.45 | 0.05 | 2.00 | 2.50 | 1.25 | 0.25 | 0.38 | 0.50 | 0.13 | 2.00 | 1.00 | 1.00 | 1.00 | 1.00 | 1.00 |
| No. 123 | 0.40 | 0.10 | 2.00 | 2.50 | 6.00 | 1.50 | 1.00 | 1.00 | 0.50 | 0.00 | 0.00 | 0.00 | 0.00 | 0.00 | 0.00 |
| No. 124 | 0.35 | 0.15 | 2.00 | 2.50 | 15.00 | 1.00 | 2.00 | 1.00 | 1.00 | 2.00 | 1.00 | 1.00 | 1.00 | 1.00 | 1.00 |
| No. 125 | 0.30 | 0.20 | 2.00 | 2.50 | 8.00 | 0.50 | 0.50 | 0.50 | 0.50 | 2.00 | 1.00 | 1.00 | 1.00 | 1.00 | 1.00 |
| No. 126 | 0.50 | 0.00 | 2.00 | 2.50 | 12.00 | 0.20 | 4.00 | 1.80 | 2.00 | 2.00 | 1.00 | 1.00 | 1.00 | 1.00 | 1.00 |
| No. 127 | 0.45 | 0.05 | 2.00 | 2.50 | 1.50 | 0.05 | 0.38 | 0.25 | 0.33 | 2.00 | 1.00 | 1.00 | 1.00 | 1.00 | 1.00 |
| No. 128 | 0.40 | 0.10 | 2.00 | 2.50 | 6.00 | 0.50 | 1.00 | 2.00 | 0.50 | 2.00 | 1.00 | 1.00 | 1.00 | 1.00 | 1.00 |
| No. 129 | 0.35 | 0.15 | 2.00 | 2.50 | 12.00 | 2.00 | 3.00 | 2.20 | 0.80 | 2.00 | 1.00 | 1.00 | 1.00 | 1.00 | 1.00 |
| No. 130 | 0.30 | 0.20 | 2.00 | 2.50 | 3.00 | 0.75 | 0.50 | 0.50 | 0.25 | 2.00 | 1.00 | 1.00 | 1.00 | 1.00 | 1.00 |
| No. 131 | 0.40 | 0.10 | 2.00 | 2.50 | 12.00 | 4.00 | 1.60 | 1.40 | 1.00 | 2.00 | 1.00 | 1.00 | 1.00 | 1.00 | 1.00 |
| No. 132 | 0.50 | 0.00 | 2.00 | 2.50 | 12.00 | 3.00 | 0.40 | 4.00 | 0.60 | 2.00 | 1.00 | 1.00 | 1.00 | 1.00 | 1.00 |
| No. 133 | 0.45 | 0.05 | 2.00 | 2.50 | 1.50 | 0.25 | 0.13 | 0.50 | 0.13 | 2.00 | 1.00 | 1.00 | 1.00 | 1.00 | 1.00 |
| No. 134 | 0.40 | 0.10 | 2.00 | 2.50 | 5.50 | 1.50 | 1.50 | 1.00 | 0.50 | 2.00 | 1.00 | 1.00 | 1.00 | 1.00 | 1.00 |
| No. 135 | 0.35 | 0.15 | 2.00 | 2.50 | 11.00 | 1.40 | 5.00 | 1.60 | 1.00 | 2.00 | 1.00 | 1.00 | 1.00 | 1.00 | 1.00 |
| No. 136 | 0.30 | 0.20 | 2.00 | 2.50 | 5.50 | 0.50 | 3.00 | 0.50 | 0.50 | 2.00 | 1.00 | 1.00 | 1.00 | 1.00 | 1.00 |
| No. 137 | 0.50 | 0.00 | 2.00 | 2.50 | 13.00 | 2.20 | 3.40 | 0.40 | 1.00 | 2.00 | 1.00 | 1.00 | 1.00 | 1.00 | 1.00 |
| No. 138 | 0.45 | 0.05 | 2.00 | 2.50 | 1.50 | 0.50 | 0.25 | 0.13 | 0.13 | 2.00 | 1.00 | 1.00 | 1.00 | 1.00 | 1.00 |
| No. 139 | 0.40 | 0.10 | 2.00 | 2.50 | 5.50 | 1.00 | 1.50 | 1.50 | 0.50 | 2.00 | 1.00 | 1.00 | 1.00 | 1.00 | 1.00 |
| No. 140 | 0.35 | 0.15 | 2.00 | 2.50 | 11.00 | 1.60 | 1.40 | 5.00 | 1.00 | 2.00 | 1.00 | 1.00 | 1.00 | 1.00 | 1.00 |
| No. 141 | 0.30 | 0.20 | 2.00 | 2.50 | 5.50 | 0.50 | 0.50 | 3.00 | 0.50 | 2.00 | 1.00 | 1.00 | 1.00 | 1.00 | 1.00 |
| No. 142 | 0.50 | 0.00 | 2.00 | 2.50 | 13.00 | 2.20 | 3.40 | 1.20 | 0.20 | 2.00 | 1.00 | 1.00 | 1.00 | 1.00 | 1.00 |
| No. 143 | 0.45 | 0.05 | 2.00 | 2.50 | 1.63 | 0.33 | 0.25 | 0.25 | 0.05 | 2.00 | 1.00 | 1.00 | 1.00 | 1.00 | 1.00 |
| No. 144 | 0.40 | 0.10 | 2.00 | 2.50 | 6.50 | 1.00 | 1.50 | 0.50 | 0.50 | 2.00 | 1.00 | 1.00 | 1.00 | 1.00 | 1.00 |
| No. 145 | 0.35 | 0.15 | 2.00 | 2.50 | 13.00 | 1.60 | 1.40 | 2.00 | 2.00 | 2.00 | 1.00 | 1.00 | 1.00 | 1.00 | 1.00 |
| No. 146 | 0.30 | 0.20 | 2.00 | 2.50 | 3.00 | 0.25 | 0.25 | 0.75 | 0.75 | 2.00 | 1.00 | 1.00 | 1.00 | 1.00 | 1.00 |
| No. 147 | 0.40 | 0.10 | 2.00 | 2.50 | 11.00 | 3.00 | 1.00 | 1.00 | 4.00 | 2.00 | 1.00 | 1.00 | 1.00 | 1.00 | 1.00 |
| No. 148 | 0.50 | 0.00 | 2.00 | 2.50 | 1.63 | 0.33 | 0.25 | 0.25 | 0.05 | 0.25 | 0.00 | 0.00 | 0.00 | 0.00 | 0.00 |
| No. 149 | 0.45 | 0.05 | 2.00 | 2.50 | 6.50 | 1.00 | 1.50 | 0.50 | 0.50 | 0.00 | 0.00 | 0.25 | 0.00 | 0.25 | 0.00 |
| No. 150 | 0.40 | 0.10 | 2.00 | 2.50 | 13.00 | 1.60 | 1.40 | 2.00 | 2.00 | 0.00 | 0.25 | 0.00 | 0.00 | 0.00 | 0.25 |
| No. 151 | 0.35 | 0.15 | 2.00 | 2.50 | 3.00 | 0.25 | 0.25 | 0.75 | 0.75 | 0.50 | 0.00 | 0.00 | 0.50 | 0.00 | 0.00 |
| No. 152 | 0.30 | 0.20 | 2.00 | 2.50 | 11.00 | 1.60 | 1.40 | 5.00 | 1.00 | 0.00 | 0.50 | 0.00 | 0.00 | 0.50 | 0.00 |
| No. 153 | 0.40 | 0.10 | 2.00 | 2.50 | 1.63 | 0.33 | 0.25 | 0.25 | 0.05 | 1.00 | 0.00 | 0.00 | 1.00 | 0.00 | 0.50 |

TABLE 3-continued

| Sample No. | Main component (mol ratio) | | | | Accessory component (mol) | | | | | | | | | | |
|---|---|---|---|---|---|---|---|---|---|---|---|---|---|---|---|
| | $K_2CO_3$ | $Na_2CO_3$ | $SrCO_3$ | $Nb_2O_5$ | MgO | $BaCO_3$ | $B_2O_3$ | $SiO_2$ | $P_2O_5$ | $La_2O_3$ | $SnO_2$ | $Y_2O_3$ | $Sb_2O_3$ | $Ta_2O_5$ | $Nb_2O_5$ |
| No. 154 | 0.50 | 0.00 | 2.00 | 2.50 | 6.50 | 1.00 | 1.50 | 0.50 | 0.50 | 0.50 | 1.00 | 1.00 | 0.00 | 0.00 | 0.00 |
| No. 155 | 0.45 | 0.05 | 2.00 | 2.50 | 13.00 | 1.60 | 1.40 | 2.00 | 2.00 | 0.00 | 0.50 | 0.00 | 0.00 | 1.00 | 1.00 |
| No. 156 | 0.40 | 0.10 | 2.00 | 2.50 | 3.00 | 0.25 | 0.25 | 0.75 | 0.75 | 2.00 | 0.00 | 1.00 | 0.00 | 1.00 | 1.00 |
| No. 157 | 0.35 | 0.15 | 2.00 | 2.50 | 11.00 | 1.60 | 1.40 | 5.00 | 1.00 | 1.00 | 1.00 | 0.00 | 2.00 | 1.00 | 0.00 |
| No. 158 | 0.30 | 0.20 | 2.00 | 2.50 | 13.00 | 1.60 | 1.40 | 2.00 | 2.00 | 1.00 | 0.50 | 1.00 | 0.50 | 0.50 | 1.00 |
| No. 159 | 0.40 | 0.10 | 2.00 | 2.50 | 13.00 | 1.60 | 1.40 | 2.00 | 2.00 | 1.00 | 0.50 | 0.50 | 1.00 | 1.00 | 1.00 |

By using 1000 g of the mixed calcined powder obtained as above, the dielectric paste, the internal electrode layer paste, the green sheet, the green chip, and the laminated ceramic sintered body were obtained in the same manner as in the first example. The conditions for the de-binder treatment, calcining and annealing are as follows. Wetter was used for humidifying each atmospheric gas.

(De-binder Treatment)
  Heating rate: 100° C./hour
  Holding temperature: 400° C.
  Temperature holding time: 8.0 hours
  Ambient gas: Humidified mixed gas of $N_2$ and $H_2$
(Calcining)
  Heating rate: 1000° C./hour
  Holding temperature: 1100° C. to 1300° C.
  Temperature holding time: 1.0 hours
  Cooling rate: 200° C./hour
  Ambient gas: Humidified mixed gas of $N_2$ and $H_2$
  Oxygen partial pressure: $10^{-6}$ to $10^{-9}$ Pa
(Annealing Treatment)
  Holding temperature: 1000° C.
  Temperature holding time: 2.0 hours
  Raising temperature, cooling rate: 200° C./hour
  Ambient gas: Humidified $N_2$ gas Composition analysis of each sample was conducted using ICP emission spectroscopy for each of the laminated ceramic sintered bodies. It was confirmed that the each of the obtained laminated ceramic sintered bodies had almost the same value as the dielectric composition described in Table 3.

After grinding the end face of the obtained laminated ceramic sintered body by sandblasting, an In—Ga eutectic alloy was applied as an external electrode, and sample Nos. 101 to 159 of the laminated ceramic capacitors having the same shape as the laminated ceramic capacitor shown in FIG. 1 were obtained. The size of each of the laminated ceramic capacitor samples obtained was 3.2 mm×1.6 mm×1.2 mm. The thickness of the dielectric layer was 10 µm. The thickness of the inner electrode layer was 2 µm. The number of the dielectric layers sandwiched between the inner electrode layers was 50.

The resistivity at room temperature and at 200° C.; the change ratio of the resistivity between the temperatures; and the direct current withstand voltage at 200° C., were measured and evaluated in the laminated ceramic capacitors of the sample Nos. 101 to 159 by the methods described below. Results are shown in Table 4.

[Measurement Method of the Resistivity at Room Temperature and at 200° C.]

Insulation resistance was measured in the laminated ceramic capacitor samples at room temperature (20° C.) and at 200° C. with the digital resistance meter (R8340 manufactured by ADVANTEST Co., Ltd.) under the condition of the measurement voltage of 50V (electric field strength 5V/µm) and the measurement time of 60 seconds. The values of the resistivity were calculated from the area of the electrode of the laminated ceramic capacitor and the thickness of the dielectric. High resistivity is preferable. It was evaluated as good when the resistivity was $5.00 \times 10^{10}$ Ωm or more at room temperature and $1.00 \times 10^9$ Ωm or more at 200° C. In Table 2, the resistivity is logarithmically represented. When $5.00 \times 10^{10}$ is logarithmically displayed, it is 10.7. When $1.00 \times 10^9$ is logarithmically displayed, it is 9.0.

[Calculation Method of the Change Ratio of the Resistivity]

As the change ratio of the resistivity, the change ratio of the logarithmic of the resistivity at 200° C. ($\rho_{(200° C.)}$) with respect to the logarithmic of the resistivity at room temperature ($\rho_{(RT)}$) was calculated by using the following formula (2) indicated below.

Change ratio (%)=

$$[\text{Log}(\rho_{(200° C.)}) - \text{Log}(\rho_{(RT)})]/\text{Log}(\rho_{(RT)}) \times 100 \quad (2)$$

It is preferable that the change ratio of the resistivity is as low as possible, and it was evaluated as good when it was −20% or less, more preferably −15% or less.

[Measurement Method of the Direct Current Withstand Voltage]

The direct current withstand voltage was applied to the multilayer ceramic capacitor sample at 200° C. at a rate of 100 V/sec boosting rate. The DC withstand voltage was defined as the voltage where the leakage current exceeded 10 mA. The DC withstand voltage is preferably 50 V/µm or more, more preferably 100 V/µm or more. More preferably, the DC withstand voltage is 150 V/µm or more.

TABLE 4

| Sample No. | Main component Substitution amount x | Content of the first accessory component (mol) | First accessory component | | | | | |
|---|---|---|---|---|---|---|---|---|
| | | | MgO a | BaO b | $B_2O_3$ c | $SiO_2$ d | $P_2O_5$ e | a + b + c + d + e |
| No. 101 | 0.00 | 20.0 | 0.20 | 0.20 | 0.20 | 0.20 | 0.20 | 1.00 |
| No. 102 | 0.10 | 15.0 | 0.30 | 0.20 | 0.10 | 0.20 | 0.20 | 1.00 |
| No. 103 | 0.20 | 20.0 | 0.40 | 0.30 | 0.10 | 0.10 | 0.10 | 1.00 |
| No. 104 | 0.40 | 5.0 | 0.45 | 0.10 | 0.10 | 0.30 | 0.05 | 1.00 |

TABLE 4-continued

| Sample No. | | | | | | | | |
|---|---|---|---|---|---|---|---|---|
| No. 105* | 0.50 | 20.0 | 0.30 | 0.10 | 0.10 | 0.40 | 0.10 | 1.00 |
| No. 106 | 0.00 | 10.0 | 0.30 | 0.20 | 0.10 | 0.20 | 0.20 | 1.00 |
| No. 107 | 0.10 | 2.5 | 0.40 | 0.30 | 0.10 | 0.10 | 0.10 | 1.00 |
| No. 108 | 0.20 | 5.0 | 0.20 | 0.20 | 0.20 | 0.20 | 0.20 | 1.00 |
| No. 109 | 0.40 | 2.5 | 0.30 | 0.10 | 0.10 | 0.40 | 0.10 | 1.00 |
| No. 110* | 0.50 | 2.5 | 0.45 | 0.10 | 0.10 | 0.30 | 0.05 | 1.00 |
| No. 111* | 0.00 | 30.0 | 0.45 | 0.10 | 0.10 | 0.30 | 0.05 | 1.00 |
| No. 112* | 0.10 | 30.0 | 0.30 | 0.10 | 0.10 | 0.40 | 0.10 | 1.00 |
| No. 113* | 0.20 | 2.0 | 0.30 | 0.20 | 0.10 | 0.20 | 0.20 | 1.00 |
| No. 114* | 0.40 | 2.0 | 0.40 | 0.30 | 0.10 | 0.10 | 0.10 | 1.00 |
| No. 115* | 0.50 | 30.0 | 0.20 | 0.20 | 0.20 | 0.20 | 0.20 | 1.00 |
| No. 116* | 0.00 | 20.0 | 0.00 | 0.20 | 0.40 | 0.20 | 0.20 | 1.00 |
| No. 117* | 0.10 | 2.5 | 0.50 | 0.00 | 0.10 | 0.20 | 0.20 | 1.00 |
| No. 118* | 0.20 | 20.0 | 0.40 | 0.30 | 0.00 | 0.20 | 0.10 | 1.00 |
| No. 119* | 0.40 | 2.5 | 0.45 | 0.20 | 0.20 | 0.00 | 0.15 | 1.00 |
| No. 120* | 0.20 | 20.0 | 0.30 | 0.15 | 0.15 | 0.40 | 0.00 | 1.00 |
| No. 121 | 0.00 | 20.0 | 0.40 | 0.15 | 0.20 | 0.15 | 0.10 | 1.00 |
| No. 122 | 0.10 | 2.5 | 0.50 | 0.10 | 0.15 | 0.20 | 0.05 | 1.00 |
| No. 123 | 0.20 | 10.0 | 0.60 | 0.15 | 0.10 | 0.10 | 0.05 | 1.00 |
| No. 124 | 0.30 | 20.0 | 0.75 | 0.05 | 0.10 | 0.05 | 0.05 | 1.00 |
| No. 125 | 0.40 | 10.0 | 0.80 | 0.05 | 0.05 | 0.05 | 0.05 | 1.00 |
| No. 126 | 0.00 | 20.0 | 0.60 | 0.01 | 0.20 | 0.09 | 0.10 | 1.00 |
| No. 127 | 0.10 | 2.5 | 0.60 | 0.02 | 0.15 | 0.10 | 0.13 | 1.00 |
| No. 128 | 0.20 | 10.0 | 0.60 | 0.05 | 0.10 | 0.20 | 0.05 | 1.00 |
| No. 129 | 0.30 | 20.0 | 0.60 | 0.10 | 0.15 | 0.11 | 0.04 | 1.00 |
| No. 130 | 0.40 | 5.0 | 0.60 | 0.15 | 0.10 | 0.10 | 0.05 | 1.00 |
| No. 131 | 0.20 | 20.0 | 0.60 | 0.20 | 0.08 | 0.07 | 0.05 | 1.00 |
| No. 132 | 0.00 | 20.0 | 0.60 | 0.15 | 0.02 | 0.20 | 0.03 | 1.00 |
| No. 133 | 0.10 | 2.5 | 0.60 | 0.10 | 0.05 | 0.20 | 0.05 | 1.00 |
| No. 134 | 0.20 | 10.0 | 0.55 | 0.15 | 0.15 | 0.10 | 0.05 | 1.00 |
| No. 135 | 0.30 | 20.0 | 0.55 | 0.07 | 0.25 | 0.08 | 0.05 | 1.00 |
| No. 136 | 0.40 | 10.0 | 0.55 | 0.05 | 0.30 | 0.05 | 0.05 | 1.00 |
| No. 137 | 0.00 | 20.0 | 0.65 | 0.11 | 0.17 | 0.02 | 0.05 | 1.00 |
| No. 138 | 0.10 | 2.5 | 0.60 | 0.20 | 0.10 | 0.05 | 0.05 | 1.00 |
| No. 139 | 0.20 | 10.0 | 0.55 | 0.10 | 0.15 | 0.15 | 0.05 | 1.00 |
| No. 140 | 0.30 | 20.0 | 0.55 | 0.08 | 0.07 | 0.25 | 0.05 | 1.00 |
| No. 141 | 0.40 | 10.0 | 0.55 | 0.05 | 0.05 | 0.30 | 0.05 | 1.00 |
| No. 142 | 0.00 | 20.0 | 0.65 | 0.11 | 0.17 | 0.06 | 0.01 | 1.00 |
| No. 143 | 0.10 | 2.5 | 0.65 | 0.13 | 0.10 | 0.10 | 0.02 | 1.00 |
| No. 144 | 0.20 | 10.0 | 0.65 | 0.10 | 0.15 | 0.05 | 0.05 | 1.00 |
| No. 145 | 0.30 | 20.0 | 0.65 | 0.08 | 0.07 | 0.10 | 0.10 | 1.00 |
| No. 146 | 0.40 | 5.0 | 0.60 | 0.05 | 0.05 | 0.15 | 0.15 | 1.00 |
| No. 147 | 0.20 | 20.0 | 0.55 | 0.15 | 0.05 | 0.05 | 0.20 | 1.00 |
| No. 148 | 0.00 | 2.5 | 0.65 | 0.13 | 0.10 | 0.10 | 0.02 | 1.00 |
| No. 149 | 0.10 | 10.0 | 0.65 | 0.10 | 0.15 | 0.05 | 0.05 | 1.00 |
| No. 150 | 0.20 | 20.0 | 0.65 | 0.08 | 0.07 | 0.10 | 0.10 | 1.00 |
| No. 151 | 0.30 | 5.0 | 0.60 | 0.05 | 0.05 | 0.15 | 0.15 | 1.00 |
| No. 152 | 0.40 | 20.0 | 0.55 | 0.08 | 0.07 | 0.25 | 0.05 | 1.00 |
| No. 153 | 0.20 | 2.5 | 0.65 | 0.13 | 0.10 | 0.10 | 0.02 | 1.00 |
| No. 154 | 0.00 | 10.0 | 0.65 | 0.10 | 0.15 | 0.05 | 0.05 | 1.00 |
| No. 155 | 0.10 | 20.0 | 0.65 | 0.08 | 0.07 | 0.10 | 0.10 | 1.00 |
| No. 156 | 0.20 | 5.0 | 0.60 | 0.05 | 0.05 | 0.15 | 0.15 | 1.00 |
| No. 157 | 0.30 | 20.0 | 0.55 | 0.08 | 0.07 | 0.25 | 0.05 | 1.00 |
| No. 158 | 0.40 | 20.0 | 0.65 | 0.08 | 0.07 | 0.10 | 0.10 | 1.00 |
| No. 159 | 0.20 | 20.0 | 0.65 | 0.08 | 0.07 | 0.10 | 0.10 | 1.00 |

| Sample No. | Second accessory component | | Resistivity at 25° C. Log($\rho/\Omega$m) | Resistivity at 200° C. Log($\rho/\Omega$m) | Change ratio of the resistivity (%) | Direct current withstand voltage (V/μm) |
|---|---|---|---|---|---|---|
| | Total content (mol) | Kind | | | | |
| No. 101 | 7.00 | La/Sn/Y/Sb/Ta//Nb | 11.0 | 9.1 | −17 | 65 |
| No. 102 | 7.00 | La/Sn/Y/Sb/Ta//Nb | 10.9 | 9.1 | −17 | 70 |
| No. 103 | 7.00 | La/Sn/Y/Sb/Ta//Nb | 11.1 | 9.1 | −18 | 75 |
| No. 104 | 7.00 | La/Sn/Y/Sb/Ta//Nb | 10.8 | 9.1 | −16 | 70 |
| No. 105* | 7.00 | La/Sn/Y/Sb/Ta//Nb | 10.2 | 6.0 | −41 | 45 |
| No. 106 | 7.00 | La/Sn/Y/Sb/Ta//Nb | 11.2 | 9.1 | −19 | 75 |
| No. 107 | 0.00 | None | 11.3 | 9.3 | −18 | 65 |
| No. 108 | 7.00 | La/Sn/Y/Sb/Ta//Nb | 11.0 | 9.1 | −17 | 70 |
| No. 109 | 7.00 | La/Sn/Y/Sb/Ta//Nb | 11.1 | 9.2 | −17 | 70 |
| No. 110* | 7.00 | La/Sn/Y/Sb/Ta//Nb | 10.5 | 6.3 | −40 | 45 |
| No. 111* | 7.00 | La/Sn/Y/Sb/Ta//Nb | 10.2 | 7.5 | −26 | 40 |
| No. 112* | 7.00 | La/Sn/Y/Sb/Ta//Nb | 10.4 | 8.0 | −23 | 40 |
| No. 113* | 7.00 | La/Sn/Y/Sb/Ta//Nb | 9.5 | 5.5 | −42 | 35 |
| No. 114* | 7.00 | La/Sn/Y/Sb/Ta//Nb | 9.8 | 6.0 | −39 | 45 |
| No. 115* | 7.00 | La/Sn/Y/Sb/Ta//Nb | 10.5 | 7.5 | −29 | 40 |
| No. 116* | 7.00 | La/Sn/Y/Sb/Ta//Nb | 9.5 | 7.0 | −26 | 35 |
| No. 117* | 7.00 | La/Sn/Y/Sb/Ta//Nb | 10.2 | 7.5 | −26 | 40 |
| No. 118* | 7.00 | La/Sn/Y/Sb/Ta//Nb | 9.8 | 7.5 | −23 | 45 |

TABLE 4-continued

| No. | | | | | |
|---|---|---|---|---|---|
| No. 119* | 7.00 | La/Sn/Y/Sb/Ta//Nb | 10.5 | 7.9 | −25 | 30 |
| No. 120* | 7.00 | La/Sn/Y/Sb/Ta//Nb | 10.1 | 7.5 | −26 | 35 |
| No. 121 | 7.00 | La/Sn/Y/Sb/Ta//Nb | 11.2 | 9.3 | −17 | 70 |
| No. 122 | 7.00 | La/Sn/Y/Sb/Ta//Nb | 11.7 | 10.2 | −13 | 85 |
| No. 123 | 0.00 | None | 11.8 | 10.4 | −12 | 80 |
| No. 124 | 7.00 | La/Sn/Y/Sb/Ta//Nb | 11.7 | 10.1 | −14 | 90 |
| No. 125 | 7.00 | La/Sn/Y/Sb/Ta//Nb | 11.3 | 9.2 | −19 | 75 |
| No. 126 | 7.00 | La/Sn/Y/Sb/Ta//Nb | 10.9 | 9.1 | −17 | 70 |
| No. 127 | 7.00 | La/Sn/Y/Sb/Ta//Nb | 11.8 | 10.3 | −13 | 95 |
| No. 128 | 7.00 | La/Sn/Y/Sb/Ta//Nb | 12.0 | 10.4 | −13 | 85 |
| No. 129 | 7.00 | La/Sn/Y/Sb/Ta//Nb | 11.7 | 10.2 | −13 | 85 |
| No. 130 | 7.00 | La/Sn/Y/Sb/Ta//Nb | 11.9 | 10.3 | −13 | 80 |
| No. 131 | 7.00 | La/Sn/Y/Sb/Ta//Nb | 11.2 | 9.1 | −19 | 65 |
| No. 132 | 7.00 | La/Sn/Y/Sb/Ta//Nb | 11.0 | 9.0 | −18 | 75 |
| No. 133 | 7.00 | La/Sn/Y/Sb/Ta//Nb | 12.1 | 10.5 | −13 | 90 |
| No. 134 | 7.00 | La/Sn/Y/Sb/Ta//Nb | 11.7 | 10.3 | −12 | 85 |
| No. 135 | 7.00 | La/Sn/Y/Sb/Ta//Nb | 11.9 | 10.4 | −13 | 90 |
| No. 136 | 7.00 | La/Sn/Y/Sb/Ta//Nb | 11.3 | 9.0 | −20 | 75 |
| No. 137 | 7.00 | La/Sn/Y/Sb/Ta//Nb | 11.2 | 9.3 | −17 | 70 |
| No. 138 | 7.00 | La/Sn/Y/Sb/Ta//Nb | 11.9 | 10.2 | −14 | 85 |
| No. 139 | 7.00 | La/Sn/Y/Sb/Ta//Nb | 12.2 | 10.6 | −13 | 80 |
| No. 140 | 7.00 | La/Sn/Y/Sb/Ta//Nb | 12.0 | 10.5 | −13 | 80 |
| No. 141 | 7.00 | La/Sn/Y/Sb/Ta//Nb | 11.2 | 9.1 | −19 | 65 |
| No. 142 | 7.00 | La/Sn/Y/Sb/Ta//Nb | 11.0 | 9.0 | −18 | 70 |
| No. 143 | 7.00 | La/Sn/Y/Sb/Ta//Nb | 12.3 | 10.7 | −13 | 85 |
| No. 144 | 7.00 | La/Sn/Y/Sb/Ta//Nb | 11.8 | 10.6 | −10 | 90 |
| No. 145 | 7.00 | La/Sn/Y/Sb/Ta//Nb | 12.0 | 10.5 | −13 | 90 |
| No. 146 | 7.00 | La/Sn/Y/Sb/Ta//Nb | 12.1 | 10.6 | −12 | 85 |
| No. 147 | 7.00 | La/Sn/Y/Sb/Ta//Nb | 11.0 | 9.0 | −18 | 70 |
| No. 148 | 0.25 | La | 11.9 | 10.4 | −13 | 65 |
| No. 149 | 0.50 | Y/Ta | 12.2 | 10.6 | −13 | 100 |
| No. 150 | 0.50 | Sn/Nb | 12.0 | 10.5 | −13 | 105 |
| No. 151 | 1.00 | La/Sb | 11.8 | 10.6 | −10 | 115 |
| No. 152 | 1.00 | Sn/Ta | 12.0 | 10.5 | −13 | 120 |
| No. 153 | 2.50 | La/Sb/Nb | 11.7 | 10.3 | −12 | 110 |
| No. 154 | 2.50 | La/Sn/Y | 11.9 | 10.4 | −13 | 120 |
| No. 155 | 2.50 | Sn/Ta/Nb | 11.9 | 10.2 | −14 | 115 |
| No. 156 | 5.00 | La/Y/Ta/Nb | 12.2 | 10.6 | −13 | 110 |
| No. 157 | 5.00 | La/Sn/Sb/Ta | 12.3 | 10.7 | −13 | 110 |
| No. 158 | 4.50 | La/Sn/Y/Sb/Ta//Nb | 11.8 | 10.6 | −10 | 125 |
| No. 159 | 5.00 | La/Sn/Y/Sb/Ta//Nb | 12.1 | 10.6 | −12 | 125 |

According to the results shown in Table 4, it was confirmed that among the samples Nos. 101 to 159, the laminated ceramic capacitors falling in the ranges of the present embodiment had good insulation property, in which the logarithmic of the resistivity at room temperature, Log($\rho_{(RT)}$), was high at 10.7 or more and the logarithmic of the resistivity at 200° C., Log($\rho_{(200° C.)}$), was high at 9.0 or more; and the change ratio of the resistivity was low at −20%, since the effect of suppressing the increase and movement of the majority carrier electrons, which were considered to be the major cause of the reduction of the resistivity, could be obtained.

On the other hand, the effect of suppressing the increase and movement of the majority carrier electrons, which were considered to be a major cause of reduction of the resistivity was hard to obtain in the sample Nos. 105, 110 and 115, since the value x in the chemical formula $(K_{1-x}Na_x)Sr_2Nb_5O_{15}$ exceeded 0.40, which was outside of the range of the present embodiment. Accordingly, it was confirmed that the logarithmic of the resistivity at room temperature, Log($\rho_{(RT)}$), was low at less than 10.7 and the logarithmic of the resistivity at 200° C., Log($\rho_{(200° C.)}$), was low at less than 9.0; and the change ratio of the resistivity exceeded −20% in the laminated ceramic capacitors of in the sample Nos. 105, 110 and 115.

In addition, the effect of suppressing the increase and movement of the majority carrier electrons, which were considered to be a major cause of reduction of the resistivity was hard to obtain in the sample Nos. 111 to 115, since the content of the first accessory component was outside of the range of the present embodiment. Accordingly, it was confirmed that the logarithmic of the resistivity at room temperature, Log($\rho_{(RT)}$), was low at less than 10.7 and the logarithmic of the resistivity at 200° C., Log($\rho_{(200° C.)}$), was low at less than 9.0; and the change ratio of the resistivity exceeded −20% in the laminated ceramic capacitors of in the sample Nos. 111 to 115.

In addition, it was confirmed that the logarithmic of the resistivity at room temperature, Log($\rho_{(RT)}$), was low at less than 10.7 and the logarithmic of the resistivity at 200° C., Log($\rho_{(200° C.)}$), was low at less than 9.0; and the change ratio of the resistivity exceeded −20% in the laminated ceramic capacitors of in the sample Nos. 116 to 120 not containing any one of MgO, BaO, $B_2O_3$, $SiO_2$ and $P_2O_5$, which were the first accessory components.

The effect of suppressing the increase and movement of the majority carrier electrons, which were considered to be the major cause of reduction of the resistivity, could be obtained in the sample Nos. 122-124, 127-130, 130-135, 138-140, 143-146 and 148-159, since when the first accessory component was expressed by aMgO-bBaO-$cB_2O_3$-$dSiO_2$-$eP_2O_5$, the relationship of a, b, c, d, and e satisfied: a+b+c+d+e=1.00; 0.50≤a≤0.75; 0.02≤b≤0.15; 0.05≤c≤0.25; 0.05≤d≤0.25; and 0.02≤e≤0.15, which were within the ranges of the present embodiment. Accordingly, it was confirmed that even better insulation property, in which the logarithmic of the resistivity at room temperature, Log($\rho_{(RT)}$), was high at 11.5 or more and the logarithmic of the resistivity at 200° C., Log($\rho_{(200° C.)}$), was high at 10.0; and the change ratio of the resistivity was low at −15%, could be realized in these samples.

Moreover, it was confirmed that the direct current withstand voltage at 200° C. was 100V/μm or more in the sample Nos. 149 to 159 containing 0.5 mol to 5.0 mol of the second accessory component which was one or more selected from: $La_2O_3$; $SnO_2$; $Y_2O_3$; $Sb_2O_3$; $Ta_2O_5$; and $Nb_2O_5$, in addition to the good insulation property in which the logarithmic of the resistivity at room temperature, $Log(\rho_{(RT)}$, was high at 11.5 or more and the logarithmic of the resistivity at 200° C., $Log(\rho_{(200° C.)})$, was high at 10.0; and the change ratio of the resistivity was low at −15%. Accordingly, by containing the second accessory component at the predetermined amount, not only the good insulation property but also the new physical property, which was the high direct current withstand voltage, could be improved.

Example 2-2

Next, the example, in which the dielectric composition contains the secondary phase including MgO and $P_2O_5$, is explained specifically below.

First, the green chips of the sample Nos. 149 to 159 produced in the first example were prepared. Laminated ceramic capacitors containing the secondary phase were produced by performing the de-binder treatment, calcination, and the anneal treatment described below on the prepared green chips.

The oxygen partial pressure in the calcining condition and the anneal condition were different from the conditions of the first example.

in sample Nos. Prepared in Example 1, 149~Sample No. We prepared 159 green chips. With respect to the prepared green chip, the following binder removal treatment, firing and annealing treatment were carried out to prepare a multilayered ceramic sintered body containing a secondary phase. It is to be noted that the condition of Example 1 is different from the oxygen partial pressure under firing conditions and the annealing treatment condition.

(De-binder Treatment)
  Heating rate: 100° C./hour
  Holding temperature: 400° C.
  Temperature holding time: 8.0 hours
  Ambient gas: Humidified mixed gas of $N_2$ and $H_2$ (Calcining)
  Heating rate: 1000° C./hour
  Holding temperature: 1100° C. to 1300° C.
  Temperature holding time: 1.0 hours
  Cooling rate: 200° C./hour
  Ambient gas: Humidified mixed gas of $N_2$ and $H_2$
  Oxygen partial pressure: $10^{-3}$ to $10^{-5}$ Pa (Annealing Treatment)
  Holding temperature: 800° C. to 8f50° C.
  Temperature holding time: 5.0 hours
  Raising temperature, cooling rate: 200° C./hour
  Ambient gas: Humidified $N_2$ gas Composition analysis of each sample was conducted using ICP emission spectroscopy for each of the laminated ceramic sintered bodies. It was confirmed that the each of the obtained laminated ceramic sintered bodies had almost the same value as the dielectric composition described in Table 5.

TABLE 5

| Sample No. | Green chip | Main component (mol ratio) | | | | Accessory component (mol) | | | | | | | | | | |
|---|---|---|---|---|---|---|---|---|---|---|---|---|---|---|---|---|
| | | $K_2CO_3$ | $Na_2CO_3$ | $SrCO_3$ | $Nb_2O_5$ | MgO | $BaCO_3$ | $B_2O_3$ | $SiO_2$ | $P_2O_5$ | $La_2O_3$ | $SnO_2$ | $Y_2O_3$ | $Sb_2O_3$ | $Ta_2O_5$ | $Nb_2O_5$ |
| No. 149 | No. 149 | 0.45 | 0.05 | 2.00 | 2.50 | 6.50 | 1.00 | 1.50 | 0.50 | 0.50 | 0.00 | 0.00 | 0.25 | 0.00 | 0.25 | 0.00 |
| No. 160 | | 0.45 | 0.05 | 2.00 | 2.50 | 6.50 | 1.00 | 1.50 | 0.50 | 0.50 | 0.00 | 0.00 | 0.25 | 0.00 | 0.25 | 0.00 |
| No. 150 | No. 150 | 0.40 | 0.10 | 2.00 | 2.50 | 13.00 | 1.60 | 1.40 | 2.00 | 2.00 | 0.00 | 0.25 | 0.00 | 0.00 | 0.00 | 0.25 |
| No. 161 | | 0.40 | 0.10 | 2.00 | 2.50 | 13.00 | 1.60 | 1.40 | 2.00 | 2.00 | 0.00 | 0.25 | 0.00 | 0.00 | 0.00 | 0.25 |
| No. 151 | No. 151 | 0.35 | 0.15 | 2.00 | 2.50 | 3.00 | 0.25 | 0.25 | 0.75 | 0.75 | 0.50 | 0.00 | 0.00 | 0.50 | 0.00 | 0.00 |
| No. 162 | | 0.35 | 0.15 | 2.00 | 2.50 | 3.00 | 0.25 | 0.25 | 0.75 | 0.75 | 0.50 | 0.00 | 0.00 | 0.50 | 0.00 | 0.00 |
| No. 152 | No. 152 | 0.30 | 0.20 | 2.00 | 2.50 | 11.00 | 1.60 | 1.40 | 5.00 | 1.00 | 0.00 | 0.50 | 0.00 | 0.00 | 0.50 | 0.00 |
| No. 163 | | 0.30 | 0.20 | 2.00 | 2.50 | 11.00 | 1.60 | 1.40 | 5.00 | 1.00 | 0.00 | 0.50 | 0.00 | 0.00 | 0.50 | 0.00 |
| No. 153 | No. 153 | 0.40 | 0.10 | 2.00 | 2.50 | 1.63 | 0.33 | 0.25 | 0.25 | 0.05 | 1.00 | 0.00 | 0.00 | 1.00 | 0.00 | 0.50 |
| No. 164 | | 0.40 | 0.10 | 2.00 | 2.50 | 1.63 | 0.33 | 0.25 | 0.25 | 0.05 | 1.00 | 0.00 | 0.00 | 1.00 | 0.00 | 0.50 |
| No. 154 | No. 154 | 0.50 | 0.00 | 2.00 | 2.50 | 6.50 | 1.00 | 1.50 | 0.50 | 0.50 | 0.50 | 1.00 | 1.00 | 0.00 | 0.00 | 0.00 |
| No. 165 | | 0.50 | 0.00 | 2.00 | 2.50 | 6.50 | 1.00 | 1.50 | 0.50 | 0.50 | 0.50 | 1.00 | 1.00 | 0.00 | 0.00 | 0.00 |
| No. 155 | No. 155 | 0.45 | 0.05 | 2.00 | 2.50 | 13.00 | 1.60 | 1.40 | 2.00 | 2.00 | 0.00 | 0.50 | 0.00 | 0.00 | 1.00 | 1.00 |
| No. 166 | | 0.45 | 0.05 | 2.00 | 2.50 | 13.00 | 1.60 | 1.40 | 2.00 | 2.00 | 0.00 | 0.50 | 0.00 | 0.00 | 1.00 | 1.00 |
| No. 156 | No. 156 | 0.40 | 0.10 | 2.00 | 2.50 | 3.00 | 0.25 | 0.25 | 0.75 | 0.75 | 2.00 | 0.00 | 1.00 | 0.00 | 1.00 | 1.00 |
| No. 167 | | 0.40 | 0.10 | 2.00 | 2.50 | 3.00 | 0.25 | 0.25 | 0.75 | 0.75 | 2.00 | 0.00 | 1.00 | 0.00 | 1.00 | 1.00 |
| No. 157 | No. 157 | 0.35 | 0.15 | 2.00 | 2.50 | 11.00 | 1.60 | 1.40 | 5.00 | 1.00 | 1.00 | 1.00 | 0.00 | 2.00 | 1.00 | 0.00 |
| No. 168 | | 0.35 | 0.15 | 2.00 | 2.50 | 11.00 | 1.60 | 1.40 | 5.00 | 1.00 | 1.00 | 1.00 | 0.00 | 2.00 | 1.00 | 0.00 |
| No. 158 | No. 158 | 0.30 | 0.20 | 2.00 | 2.50 | 13.00 | 1.60 | 1.40 | 2.00 | 2.00 | 1.00 | 0.50 | 1.00 | 0.50 | 0.50 | 1.00 |
| No. 169 | | 0.30 | 0.20 | 2.00 | 2.50 | 13.00 | 1.60 | 1.40 | 2.00 | 2.00 | 1.00 | 0.50 | 1.00 | 0.50 | 0.50 | 1.00 |
| No. 159 | No. 159 | 0.40 | 0.10 | 2.00 | 2.50 | 13.00 | 1.60 | 1.40 | 2.00 | 2.00 | 1.00 | 0.50 | 0.50 | 1.00 | 1.00 | 1.00 |
| No. 170 | | 0.40 | 0.10 | 2.00 | 2.50 | 13.00 | 1.60 | 1.40 | 2.00 | 2.00 | 1.00 | 0.50 | 0.50 | 1.00 | 1.00 | 1.00 |

In order to distinguish the laminated ceramic capacitors from ones produced in the first example, new sample numbers were given to ones produced in the example 2-1 (sample Nos. 160 to 170).

The obtained laminated ceramic calcined bodies were subjected to polishing; and the outer electrodes were mounted thereon as in the first example to obtain the laminated ceramic capacitors of the sample Nos. from 160 to 170, which had the same shape as ones obtained in the first example.

The resistivity at room temperature, at 200° C. and at 250° C.; the change ratio of the resistivity between the temperatures; the direct current withstand voltage at 200° C.; and the area ratio of the secondary phase from the image analysis, were measured and evaluated in the laminated ceramic capacitors of the sample Nos. 160 to 170 by the methods described below. Results are shown in Table 6.

[Measurement Method of the Resistivity at Room Temperature, at 200° C. and at 250° C.]

Insulation resistance was measured in the laminated ceramic capacitor samples at room temperature (20° C.), at 200° C. and at 250° C. with the digital resistance meter (R8340 manufactured by ADVANTEST Co., Ltd.) under the condition of the measurement voltage of 10V (electric field strength 5V/μm) and the measurement time of 60 seconds. The values of the resistivity were calculated from the area of the electrode of the laminated ceramic capacitor and the thickness of the dielectric. High resistivity is preferable. It was evaluated as good when the resistivity was $5.00\times10^{10}$ Ωm or more at room temperature and $1.00\times10^{9}$ Ωm or more at 200° C. and at 250° C. In Table 6, the resistivity is logarithmically represented. When $5.00\times10^{10}$ is logarithmically displayed, it is 10.7. When $1.00\times10^{9}$ is logarithmically displayed, it is 9.0.

[Calculation Method of the Change Ratio of the Resistivity]

As the change ratio of the resistivity, the change ratio of the logarithmic of the resistivity at 200° C. or 250° C. ($\rho_{(200°\,C.\,or\,250°\,C.)}$) with respect to the logarithmic of the resistivity at room temperature ($\rho_{(RT)}$) was calculated by using the following formula (3) indicated below.

Change ratio (%)=

[Log($\rho_{(200°\,C.\,or\,250°\,C.)}$)−Log($\rho_{(RT)}$)]/Log($\rho_{(RT)}$)×100  (3)

dielectric layer. These TEM samples were subjected to STEM-EDS (Scanning Transmission Electron Microscopy-Energy Dispersive X-ray Spectrometry) mapping using JEM 2200FS, which is a scanning transmission electron microscope manufactured by JEOL. The field of view of the mapping was 7 μm×7 μm, and mapping was performed over 10 fields or more for each sample. By using the elemental mapping obtained by the above-described method, areas of: Mg and P, which were the major component elements of the $3MgO.P_2O_5$-based phosphate crystal; and Mg, Ba and P, which were the major component elements of the (MgO.BaO)—$P_2O_5$-based phosphate crystal, were identified. Then, the area ratio occupied by the entire secondary phase was calculated by calculating the area ratio of each compound using the average area from results over 10 fields of view. It was evaluated as good when the area occupied by the secondary phase was 2.0% to 15.0% in order to reduce the change ratio of the resistivity in the wider temperature range from room temperature to 250° C. in the present example.

TABLE 6

| Sample No. | Green chip | Secondary phase Ratio (%) | Presence or absence | Resistivity at 25° C. Log(ρ/Ωm) | Resistivity at 200° C. Log(ρ/Ωm) | Resistivity at 250° C. Log(ρ/Ωm) | Change ratio of the resistivity RT-200° C. (%) | Change ratio of the resistivity RT-250° C. (%) | Direct current withstand voltage at 200° C. (V/μm) |
|---|---|---|---|---|---|---|---|---|---|
| No. 149 | No. 149 | 0.5 | A | 12.2 | 10.6 | 9.1 | −13 | −25 | 100 |
| No. 160 |  | 2.5 | A | 12.4 | 11.0 | 10.2 | −12 | −18 | 110 |
| No. 150 | No. 150 | 1.0 | A | 12.0 | 10.5 | 9.0 | −13 | −25 | 105 |
| No. 161 |  | 15.0 | A | 12.2 | 10.9 | 9.8 | −11 | −20 | 115 |
| No. 151 | No. 151 | 0.5 | A | 11.8 | 10.6 | 9.1 | −10 | −23 | 115 |
| No. 162 |  | 4.5 | A | 12.0 | 10.9 | 9.7 | −9 | −19 | 125 |
| No. 152 | No. 152 | 1.0 | A | 12.2 | 10.5 | 9.0 | −14 | −26 | 120 |
| No. 163 |  | 7.5 | A | 12.4 | 11.1 | 10.2 | −11 | −18 | 125 |
| No. 153 | No. 153 | 0.3 | A | 11.7 | 10.3 | 8.8 | −12 | −25 | 110 |
| No. 164 |  | 2.0 | A | 11.9 | 10.7 | 10.0 | −10 | −16 | 125 |
| No. 154 | No. 154 | 1.2 | A | 11.9 | 10.4 | 8.9 | −13 | −25 | 120 |
| No. 165 |  | 5.0 | A | 12.1 | 10.8 | 10.1 | −11 | −17 | 130 |
| No. 155 | No. 155 | 1.8 | A | 11.9 | 10.2 | 8.7 | −14 | −27 | 115 |
| No. 166 |  | 10.0 | A | 12.1 | 10.8 | 9.9 | −11 | −18 | 125 |
| No. 156 | No. 156 | 1.1 | A | 12.2 | 10.6 | 9.1 | −13 | −25 | 110 |
| No. 167 |  | 3.5 | A | 12.4 | 11.0 | 10.0 | −12 | −20 | 125 |
| No. 157 | No. 157 | 0.7 | A | 12.3 | 10.7 | 9.2 | −13 | −25 | 110 |
| No. 168 |  | 6.5 | A | 12.5 | 11.0 | 10.5 | −12 | −16 | 130 |
| No. 158 | No. 158 | 1.9 | A | 11.8 | 10.6 | 9.2 | −10 | −22 | 125 |
| No. 169 |  | 18.0 | A | 12.0 | 11.4 | 9.5 | −5 | −21 | 115 |
| No. 159 | No. 159 | 1.3 | A | 12.1 | 10.6 | 9.1 | −12 | −25 | 125 |
| No. 170 |  | 14.0 | A | 12.3 | 11.4 | 10.2 | −7 | −17 | 130 |

It is preferable that the change ratio of the resistivity is as low as possible, and it was evaluated as good when it was −20% or less, more preferably −15% or less.

[Measurement Method of the Direct Current Withstand Voltage]

The direct current withstand voltage was applied to the multilayer ceramic capacitor sample at 200° C. at a rate of 100 V/sec boosting rate. The DC withstand voltage was defined as the voltage where the leakage current exceeded 10 mA. The DC withstand voltage is preferably 50 V/μm or more, more preferably 100 V/μm or more. More preferably, the DC withstand voltage is 150 V/μm or more.

[Area Ratio of the Secondary Phase by Image Analysis]

Micro-sampling was performed on the samples of the laminated ceramic capacitors obtained by calcining using FIB (Focused Ion Beam) to prepare TEM samples of the "A" in Table 6 means that the secondary phase was present (the area ratio of the secondary phase including MgO and $P_2O_5$ was 2.0% or more).

According to Table 6, the change ratio of the resistivity at 250° C. with respect to the resistivity at room temperature was −20% or less in samples, in which the secondary phase was present with the area ratio of 2.0% to 15%. Thus, it was confirmed that good insulation property could be retained even in the wider temperature range in these samples.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

INDUSTRIAL APPLICABILITY

The dielectric composition and the electronic component can be applied to the use as the electronic component, which is used under the environment in the vicinity to the engine room of automobile or mounted in the vicinity of the power device using SiC or GaN-based semiconductor, since they have good insulation property in the wide temperature range from room temperature to 200° C. or from room temperature to 250° C.

REFERENCE SIGN LIST 1, 101: Laminated ceramic capacitor
2, 102: Dielectric layer
3, 103: Inner electrode layer
4, 104: Outer electrode
10, 110: Capacitor element main body

What is claimed is:

1. A dielectric composition comprising a tungsten bronze type complex oxide expressed by a chemical formula $(K_{1-x}Na_x)Sr_2Nb_5O_{15}$ as a main component, x satisfying 0≤x≤0.50, wherein
the dielectric composition includes a secondary phase of at least one or more selected from: $2MgO.SiO_2$; $BaO.2MgO.2SiO_2$; and $2MgO.B_2O_3$, and
the secondary phase in stoichiometry have at least one molar ratio selected from the group consisting of 2 moles Mg per one mole Si, one mole Ba and 2 moles Mg per one 2moles Si, and 2 moles Mg per one mole B.

2. The dielectric composition according to claim 1, wherein,
when a total area of a cross section of the dielectric composition is defined as 100%, an area occupied by the secondary phase in a cross section is 1.5% to 20.0%.

3. The dielectric composition according to claim 1, further comprising at least one or more selected from: $La_2O_3$; $SnO_2$; $Y_2O_3$; $Sb_2O_3$; $Ta_2O$; and $Nb_2O_5$ as an accessory component in a content of 0.5 mol to 5.0 mol per 100 mol of the main component.

4. An electronic component comprising a dielectric layer and an internal electrode layer, wherein the dielectric layer is made of the dielectric composition according to claim 1.

5. A dielectric composition comprising a tungsten bronze type complex oxide expressed by a chemical formula $(K_{1-x}Na_x)Sr_2Nb_5O_{15}$ as a main component, x satisfying 0≤x≤0.40, wherein
the dielectric composition comprises: MgO; BaO; $B_2O_3$; $SiO_2$; and $P_2O_5$ as a first accessory component in a total content of 2.5 mol to 20.0 mol per 100 mol of the main component.

6. The dielectric composition according to claim 5, wherein
when the first accessory component is expressed by $aMgO-bBaO-cB_2O_3-dSiO_2-eP_2O_5$, a relationship of a, b, c, d, and e satisfies:
a+b+c+d+e=1.00;
0.50≤a≤0.75;
0.02≤b≤0.15;
0.05≤c≤0.25;
0.05≤d≤0.25; and
0.02≤e≤0.15.

7. The dielectric composition according to claim 5, further comprising at least one or more selected from: $La_2O_3$; $SnO_2$; $Y_2O_3$; $Sb_2O_3$; $Ta_2O_5$; and $Nb_2O_5$ as a secondary accessory component in a content of 0.5 mol to 5.0 mol per 100 mol of the main component.

8. The dielectric composition according to claim 5, further comprising a secondary phase including MgO and $P_2O_5$, wherein
when a total area of a cross section of the dielectric composition is defined as 100%, an area occupied by the secondary phase in the cross section is 2.0% to 15.0%.

9. An electronic component comprising a dielectric layer and an internal electrode layer, wherein the dielectric layer is made of the dielectric composition according to claim 5.

* * * * *